United States Patent [19]

Miller et al.

[11] 4,126,200
[45] Nov. 21, 1978

[54] VEHICLE DRIVE SYSTEM

[75] Inventors: Morris L. Miller; Daniel Locker, both of Jerusalem, Israel

[73] Assignee: The Scientific Research Foundation, Jerusalem, Israel

[21] Appl. No.: 774,228

[22] Filed: Mar. 3, 1977

[30] Foreign Application Priority Data

Mar. 12, 1976 [IL] Israel ................................. 49201

[51] Int. Cl.² ............................................. B60K 9/04
[52] U.S. Cl. .................................. 180/66 R; 74/751; 180/54 R
[58] Field of Search .............. 180/66 R, 66 E, 54 R; 74/857, 751; 192/0.092, 0.098; 60/698, 706, 709, 7

[56] References Cited

U.S. PATENT DOCUMENTS

| | | | |
|---|---|---|---|
| 2,803,151 | 8/1957 | Clerk | 180/54 R |
| 3,493,066 | 2/1970 | Dooley | 180/54 R |
| 3,734,222 | 5/1973 | Bardwick | 180/54 R |
| 3,870,116 | 3/1975 | Seliber | 180/54 R |
| 3,882,950 | 5/1975 | Strohlein | 180/54 R |

Primary Examiner—Joseph F. Peters, Jr.
Assistant Examiner—Gene A. Church
Attorney, Agent, or Firm—Donald M. Sandler

[57] ABSTRACT

A vehicle drive system comprising a source of rotational energy, a flywheel, continuously variable transmission apparatus comprising first and second drive terminals, and apparatus for selectable coupling of the variable transmission apparatus and the source of rotational energy to said flywheel and drive wheels in a vehicle and including first apparatus for coupling in a first mode of operation, the flywheel and the source of rotational energy to the first drive terminal, and the second drive terminal to the drive wheels of a vehicle, and second apparatus for coupling in a second mode of operation, the flywheel to the second drive terminal, the rotational energy source and the first drive terminal to the drive wheels, and control apparatus for governing the operation of the continuously variable transmission apparatus and the operation of the source of rotational energy and being capable of independent control of the speed of the flywheel and of the source of rotational energy.

27 Claims, 17 Drawing Figures

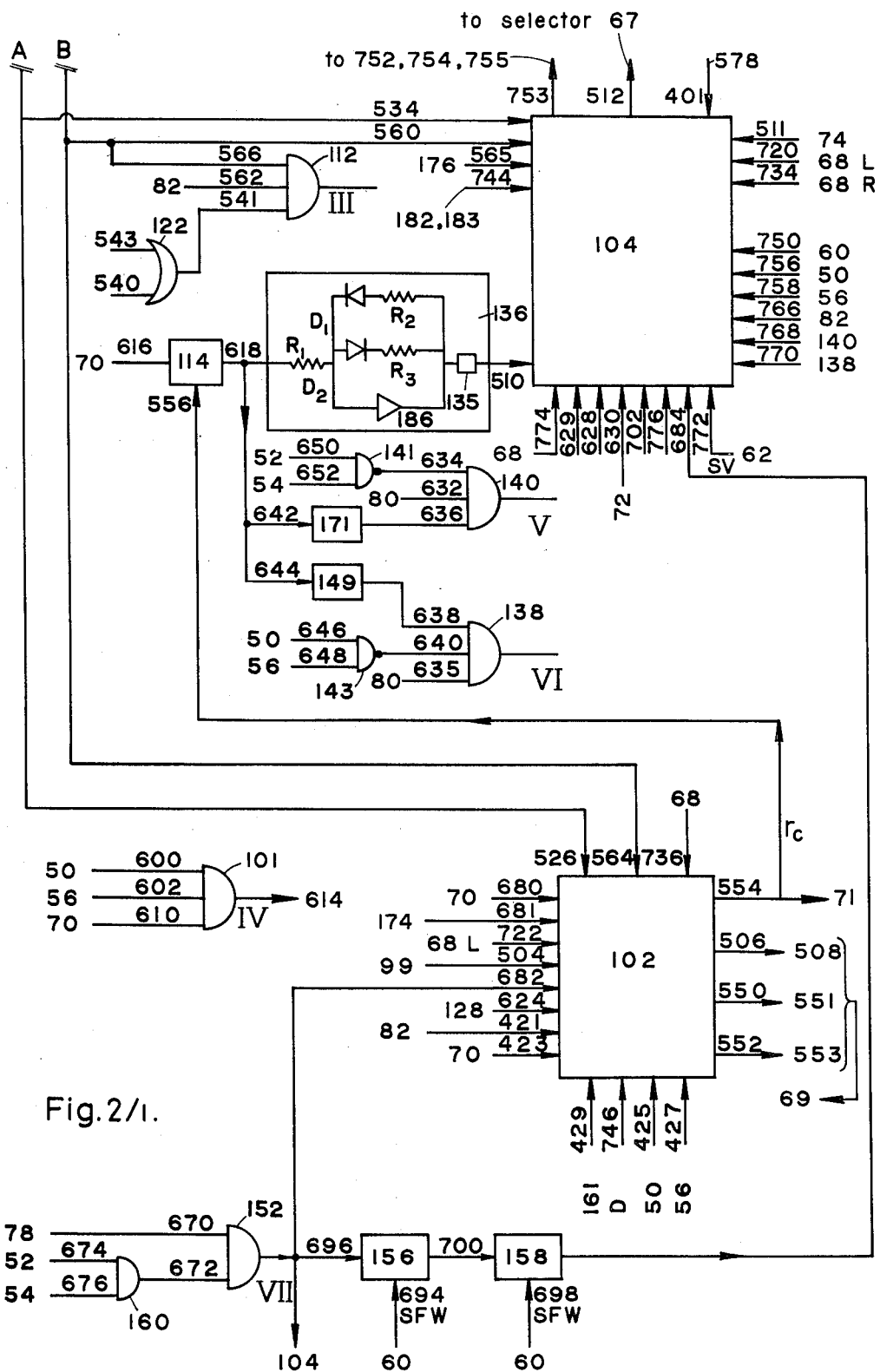
Fig.2/1.

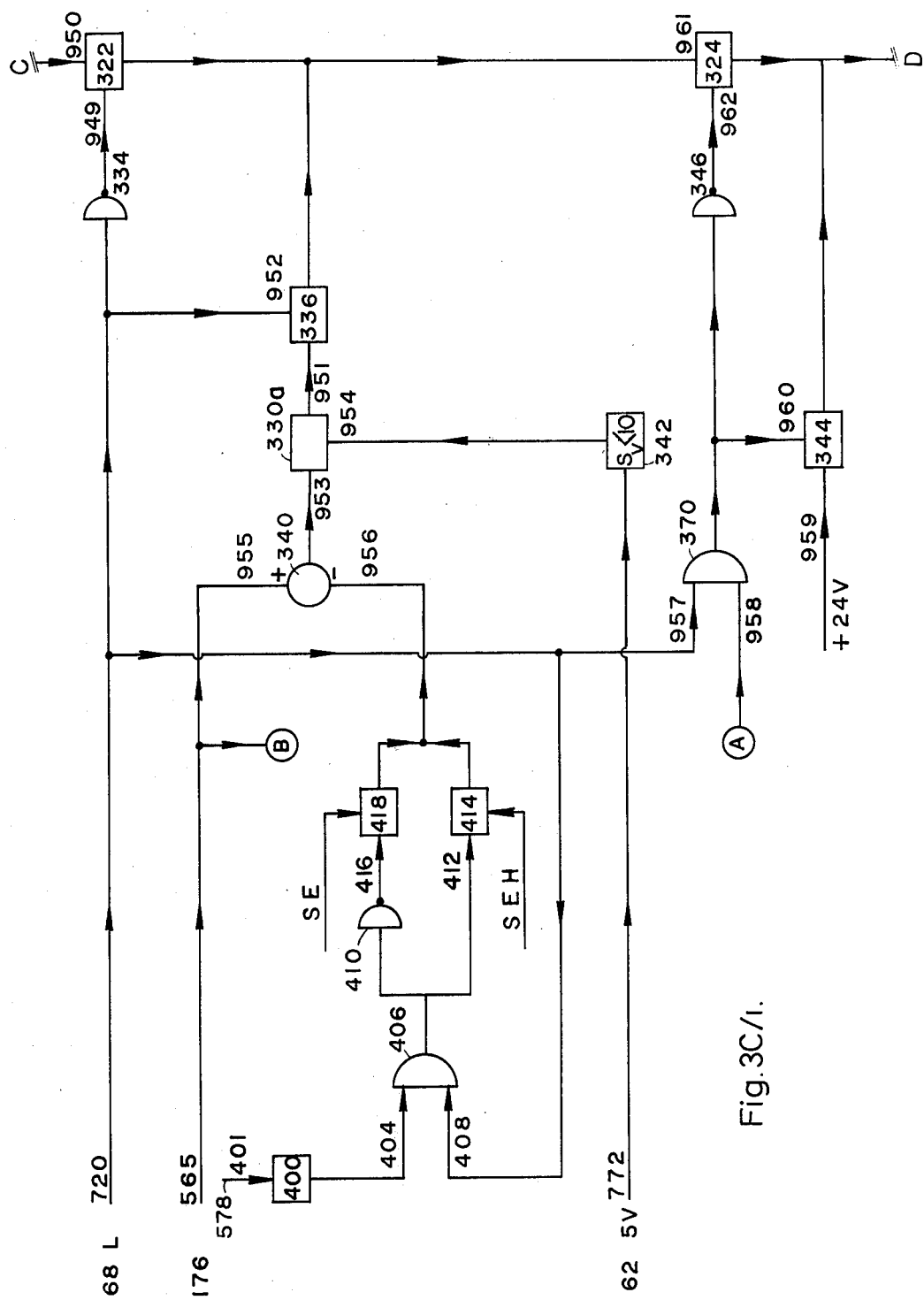
Fig.3C/1.

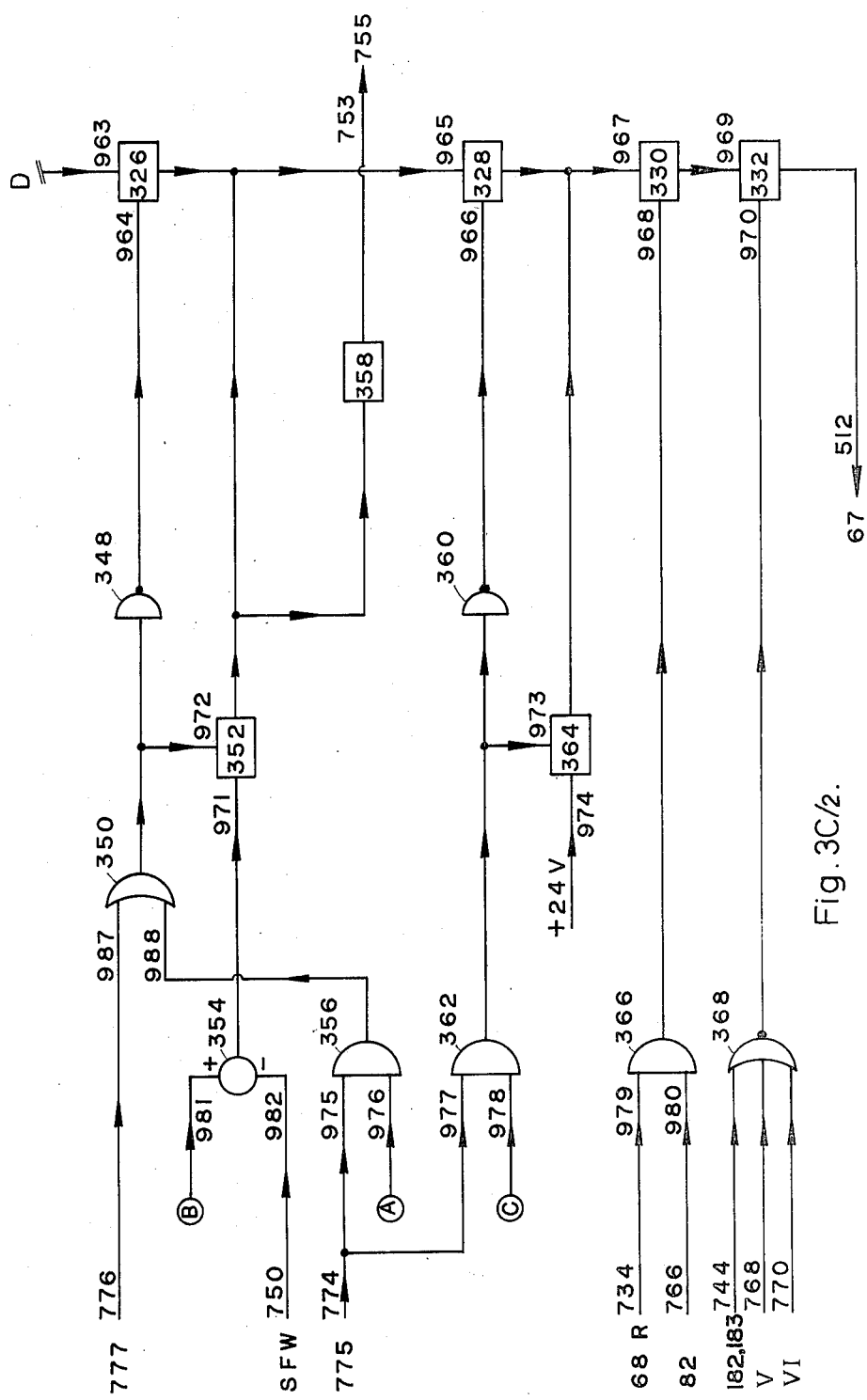
Fig. 3C/2.

VEHICLE DRIVE SYSTEM

The present invention relates to drive systems for vehicles powered by heat engines and more particularly to a drive and transmission system providing kinetic energy storage for use in a heat engine powered vehicle such as an automobile powered by an internal combustion engine. According to an embodiment of the invention an electric motor driven vehicle, for example, a forklift truck device may be constructed in accordance with the teachings below.

There have been a number of attempts in the past to provide drive systems for vehicles which include kinetic energy storage apparatus. During the 1950's the Oerlikon Company of Switzerland attempted to construct an electric vehicle. That vehicle comprised a pair of motor-generators, a flywheel and electrical control apparatus and was operated in the following way: In a first mode of operation electric current, received from an outside source is applied to a first motor-generator operating in a motor mode to rotate the flywheel at a high rate of rotation thereby storing kinetic energy therein. During operation of the vehicle in a second mode, flywheel kinetic energy is converted by the same motor-generator, now operating in a generator mode, to electrical current which in turn is supplied to the second motor generator operating in a motor mode to drive the vehicle. In a third operating mode during deceleration of the vehicle the kinetic energy of the vehicle is converted to electrical current by the second motor generator operating in a generator mode and the electrical current is in turn employed to operate the first motor generator in a motor mode to re-energize the flywheel.

This attempt to use stored kinetic energy suffers from the following disadvantages: The efficiency of energy transfer is severely constrained by the limited efficiencies of the respective motor-generators and of the electrical control apparatus. At most, the efficiency of conventional motor-generators is approximately 88% and under normal operating conditions this efficiency drops to between 70 and 80%. Since driving of the vehicle from stored kinetic energy requires operation of both motor generators in series in addition to functioning of the control circuitry, the efficiency of the device is lowered to an unacceptable level. The second significant disadvantage lies in the high cost of the pair of motor generators and the high cost of the electrical controller which results from its relative complexity and its required high power operation.

Another attempt to construct a drive system for a heat engine powered vehicle having kinetic energy storage was made in the 1950's in Great Britain. This system, known as Gyreacta, comprises a flywheel and a heat engine coupled to respective first and second shafts of a planetary differential transmission. The third shaft of the transmission is connected to driving wheels of the vehicle. As with all differential transmissions the respective torques and rotation speeds of the various shafts are governed by the following equations:

$$a_1 T_1 + a_2 T_2 + a_3 T_3 = 0$$

$$b_1 N_1 + b_2 N_2 + b_3 N_3 = 0$$

where $T_1$ equals the torque on the flywheel $T_2$ equals the torque of the heat engine and $T_3$ equals the output torque to the driving wheels and where $N_1$ equals the rotational speed of the flywheel $N_2$ equals the rotational speed of the heat engine, $N_3$ equals the rotational speed of the output shaft and $a_1$, $a_2$, $a_3$, $b_1$, $b_2$ and $b_3$ are constants determined by the structure of the differential.

For this reason the torques and rotational speeds of the heat engine and flywheel are not independently controllable as is necessary in order to optimise the efficiency of flywheel utilization.

A further attempt to design a drive system providing kinetic energy storage was undertaken at the Technische Hochschule Aachen in West Germany and is described in a publication entitled "Hybrid Drive with Flywheel Component for Economic and Dynamic Operation", which was presented at the Electric Vehicle Symposium held at Washington D.C. in February, 1973.

The proposed device provides a combination of a heat engine, flywheel, an electric motor-generator and a differential. The heat engine is directly coupled to a flywheel and to a first shaft of a differential. The motor-generator is coupled to the second shaft of the differential and the third shaft of the differential is connected to a multi-speed gearbox. The gearbox output is connected to the drive wheels of a vehicle. By controlling the torque produced by the electric motor-generator and the fuel supply to the heat engine, the flywheel can be made to decelerate during vehicle acceleration and to recover energy during vehicle deceleration. During operation of the vehicle the heat engine is directly coupled to the flywheel at a fixed gear ratio.

The Aachen device suffers from a significant disadvantage in that, due to the direct coupling between the heat engine and the flywheel, the heat engine rotates at maximum velocity when the vehicle is travelling at its minimum speed and rotates at a minimum velocity at high vehicle speeds. Since the torque output of the heat engine at low rotational velocity is relatively small and thus insufficient to power a vehicle at relatively high vehicle speeds, the fixed gear ratio must be relatively low so as to permit sufficiently high engine rotational velocity at high vehicle speeds. Use of such a low gear ratio, however, results in unacceptably high engine speeds at low vehicle velocities. Rotation of the heat engine at maximum velocity is undesirable due to decreased fuel efficiency, increased noise and increased wear of the moving parts of the engine.

Fuel consumption in a conventional heat engine is known to vary as an exponential function of the rotational velocity of the engine. Thus for operation of the Aachen vehicle below 25 kms per hour, for example, for which there is a relatively low power requirement, the relatively high speed rotation of the heat engine results in relatively high fuel consumption as compared with the actual power output.

Engine life is known to be an inverse function of the average operating speed of conventional heat engines. During normal non-highway use a vehicle usually travels at less than half of its maximum velocity. Thus in the Aachen vehicle, maximum engine wear and noise output, and poor specific fuel consumption occur during a relatively large part of the operating cycle. Operating cycles are described in the following publications, inter alia:

(a) Development of the Federal Urban Driving Schedule S.A.E. Paper 730553

(b) Development of the Federal Urban Driving Cycle for Fuel Economy Measurement Kruse, R. E. and Paulsell, C. D. March 1974, EPA Office of Air Programs, Ann Arbor, Michigan.

(c) Characteristics of Urban Bus Driving Cycles R. A. Renner and R. D. Lawhorn S.A.E. Paper 720239

(c) Electric Vehicle Test Procedure S.A.E. J227.

A further significant disadvantage apparent in the Aachen system is the relatively high cost thereof occasioned by the required provision of the motor-generator, a storage battery for powering thereof and a control system for governing the torque output of the motor generator.

Two additional developments in the area of drive and transmission systems providing kinetic energy storage for use with a heat engine are described in a Lockheed Corporation publication of Apr. 30, 1971 entitled Flywheel Feasibility — Study and Demonstration (CMSC-0007915).

The Lockheed publication describes a first embodiment comprising an engine and flywheel coupled via separate clutches to the input of a variable speed transmission whose output is connected to the drive wheels of a vehicle. This embodiment differs from the Aachen device in that it does not require the provision of an electric motor-generator or a power supply therefor. Furthermore, while the Aachen device employs a differential transmission the Lockheed system employs a conventional continuously variable transmission. However the disadvantages present in the Aachen device arising out of the direct coupling of the heat engine and flywheel at a fixed gear ratio are present in this first embodiment.

The second embodiment disclosed in the Lockheed publication comprises a flywheel coupled via a variable transmission to a drive wheel of a vehicle and a power source such as a heat engine coupled via a second variable transmission to the flywheel and to the first variable transmission. According to this embodiment of the Lockheed device the flywheel and the heat engine are connected such that both of their power outputs simultaneously pass to the drive wheels of the vehicle. The system suffers from the disadvantage of relatively high cost due to the requirement of two variable transmissions and of consequent lowered efficiency due to the fact that power from the energizing motor must pass through two variable transmissions before reaching the drive wheels of the vehicle.

There is also disclosed at pages 4-3 to 4-5 of the aforesaid Lockheed publication a control system for controlling the heat-engine output so as to hold at a constant value the sum of the kinetic energies of the flywheel and the vehicle. The speed of the vehicle is squared and scaled to give the vehicle kinetic energy. Likewise the flywheel speed is squared and scaled to yield the flywheel kinetic energy. These two kinetic energy values are added to give the total kinetic energy of the flywheel-vehicle combination. From this total kinetic energy value is subtracted a predetermined quantity, essentially equal to the kinetic energy of the fully loaded vehicle at maximum cruise velocity. The resulting error signal is then used as a feedback signal to control the heat-engine output so as to minimize the error signal and thereby hold the total kinetic energy fixed.

The net result of the Lockheed "total kinetic energy" control approach is that the flywheel provides power for vehicle acceleration (and stores power during vehicle deceleration) while the heat engine supplies only cruise power and accessory power.

An exemplary embodiment of the proposed Lockheed control system is illustrated in FIG. 4-1 of the aforesaid Lockheed publication and shows a control system in which the transmission ratio is controlled on the basis of an estimated cruise power requirement which is calculated as a direct function of vehicle speed.

The primary control of the vehicle transmission ratio in the proposed Lockheed system is the estimated demand for acceleration torque calculated as a function of vehicle speed. The total kinetic energy computation is applied as an error signal to linearly override the power signal to the heat engine so that the total kinetic energy is maintained essentially constant.

The present invention seeks to overcome the disadvantages of the prior art attempt and provides a vehicle drive system comprising:

a source of rotational energy;
a flywheel;
continuously variable transmission means compromising first and second drive terminals; and
means for selectable coupling of said variable transmission means and said source of rotational energy to said flywheel and drive wheels in a vehicle, and including first means for coupling in a first mode of operation:
(1) said flywheel and said source of rotational energy to said first drive terminal; and
(2) said second drive terminal to the drive wheels of a vehicle; and second means for coupling in second mode of operation:
(1) said flywheel to said second drive terminal;
(2) said rotational energy source and said first drive terminal to said drive wheels; and control means for governing the operation of said continuously variable transmission means and the operation of said source of rotational energy and being capable of independent control of speed of said flywheel and of said source of rotational energy.

According to a further embodiment of the invention, said first and second means are operative such that transitions between said first and second modes of operation each occur substantially synchronously.

According to another embodiment of the invention there is provided a vehicle drive system wherein the control means comprises:

means for determining the total kinetic energy of the vehicle and the flywheel;

means for comparing the total kinetic energy with a reference kinetic energy to produce a control signal;

fuel supply means responsive to said control signal to govern the fuel supply to said heat engine and thereby to govern the output thereof.

According to another embodiment of the invention the vehicle drive system describe hereinabove may also comprise; operator-actuated means for producing a desired torque output signal;

means resonsive to said control signal and to said desired torque output signal for producing a transmission ratio control signal indicative of the sense and the amplitude of the difference between the desired torque indicated by an operator and the torque output of said heat engine indicated by said torque control signal; and transmission actuator means operative to vary the transmission ratio of said variable transmission means in response to said hydrostatic transmission ratio control signal.

In accordance with a preferred embodiment of the invention, the incorporation of a flywheel in addition to the heat engine enables a heat engine of relatively low power output to be employed wherein the power output of the heat engine is selected in accordance with the steady power requirements of the vehicle for cruising and hill climbing. Energy is stored in the flywheel during a starting mode of operation when the vehicle is at rest and the motor is coupled to the flywheel via the continuously variable transmission for energization of the flywheel. Additional power is transferred to the flywheel during deceleration of the vehicle. Power is transferred to the drive wheels, either directly or through a single continuously variable transmission, thus eliminating the inefficiencies inherent in the series combination of two electric motor-generators in the Oerlikon device.

According to an embodiment of the invention, in contrast to the prior art Aachen device and to the first embodiment disclosed in the Lockheed publication, the source of rotational energy and the flywheel are not directly coupled at a fixed gear ratio in all of the drive modes. Thus the flywheel rotational velocity may be a varying multiple of the engine speed during starting mode flywheel energization, as well as operation in Second, LOW and highway modes of operation, and a desired fixed multiple thereof during directly coupled operation of the flywheel and engine in the first mode of operation.

In contrast with the double variable transmission embodiment proposed by Lockheed a preferred embodiment of the present invention employs only a single variable transmission operable in a number of differing modes to govern:

(a) the speed relationship between the flywheel and the rotational energy source, and
(b) the speed relationship between the flywheel and rotational energy source on one hand and the vehicle wheels on the other.

The control means constructed and operative in accordance with an embodiment of the invention enables independent control of the rotational speed and torque of the flywheel and rotational energy source. This feature of the present invention enables the operation of the flywheel and rotational energy source to be governed in a manner so as to produce maximum efficiency and fuel economy under differing driving conditions. Prior art devices such as the Gyreacta in which flywheel and engine operation are not independently controllable are inherently incapable of such efficiency and economy over a wide range of driving conditions.

In contrast to the transmission control system proposed by Lockheed and discussed above, in accordance with an embodiment of the invention, wherein the heat engine is an automotive diesel engine, the primary control of engine output is the output of a circuit, which measures the total kinetic energy of the vehicle and flywheel compared with a reference, which directly controls the amount of fuel injected to the engine per revolution of the engine. The amount of fuel injected to the engine per revolution, is substantially proportional to the torque produced by the engine. This output is compared with the desired torque indicated by the position of the accelerator pedal and the comparison is used to control the transmission ratio and thus the vehicle speed. Thus, in contract to the Lockheed system where there is a more or less direct effect of accelerator pedal position on the engine speed and thus on the fuel supply, in accordance with an embodiment of the present invention the variations in accelerator pedal position directly affect the transmission ratio and thus the vehicle speed and may or may not affect the fuel supply to the engine.

In an alternative embodiment of the invention, wherein the heat engine may be an automotive Otto engine, the fuel supply to the engine is substantially proportional to the power output of the engine.

As will be more clearly understood hereinafter the drive and transmission system of an embodiment of the present invention is particularly suitable for use with a heat engine as the rotational energy source and provides efficiencies in engine size, engine life, fuel consumption and noise and pollution reduction which could not be realised even by combining the known features of the above described prior art in this area.

The invention will be more fully understood and appreciated from the following detailed description taken in conjunction with the drawings in which.

Figure 1:
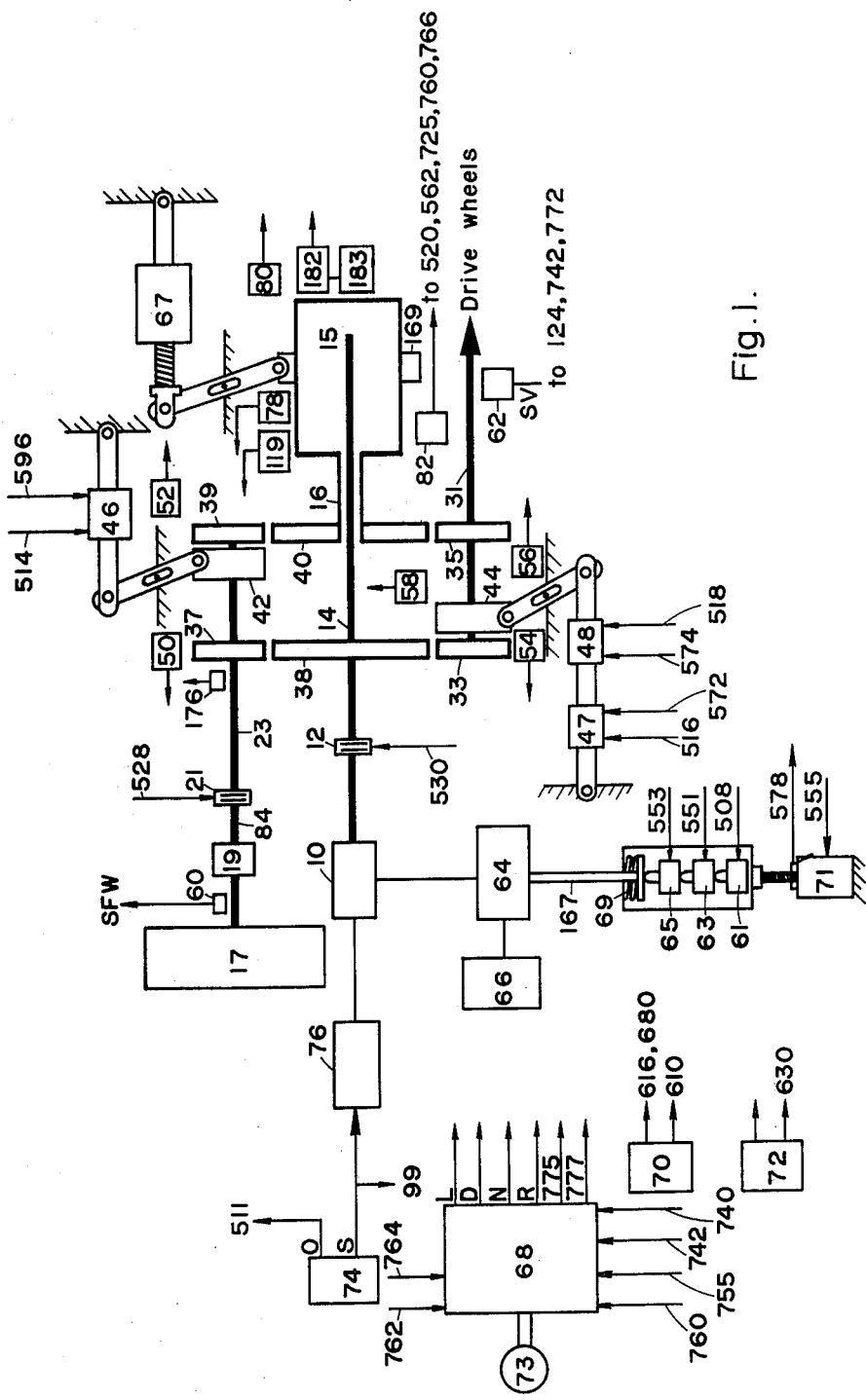
FIG. 1 is a schematic diagram of a preferred embodiment of the invention.

Referring now to FIG. 1 there is shown in schematic diagram form a preferred embodiment of the invention. A heat engine 10 is coupled via a clutch 12 to a first drive terminal 14 of a continuously variable transmission 15.

In the embodiment of the invention shown, where the gross weight of the vehicle is 3400 kilograms, heat engine 10 is a conventional diesel engine providing a 50 horsepower output. Such a vehicle is capable of fulfilling the duty cycles specified in the SAE-J227 standard published by the Society of Automotive Engineers of the U.S.A. In contrast, analogous conventional vehicles weighing 3400 kilograms would require a 90 HP engine to fulfill SAE J227. It is appreciated, however, that heat engine 10 may be any type of combustion engine such as a conventional piston engine whether operating on the otto, diesel, or dual cycle, a rotary engine, gas turbine or any other type of internal or external combustion engine. According to an alternative embodiment of the invention heat engine 10 may be replaced by a speed-controlled electric motor.

Hydrostatic transmission 15 is preferably a conventional power-splitting hydrostatic transmission such as that described in the following reference: Axialkolben-Umlaufgetriebe, Systematische Ordnung und Berechnung, Dr. -Ing. Helmar Strauch, Mainz/Rh., Oelhydraulik und pneumatic 15 (1971) Nr. 9 Pg. 385-391. Other types of continuously variable transmissions may alternatively be employed in apparatus constructed and operative in accordance with an embodiment of the invention. However, it has been found that power-splitting transmissions provide relatively high efficiency power transfer in a relatively compact apparatus.

Hydrostatic transmission 15 is equipped with two normally closed microswitches 182 and 183 connected physically to the high pressure relief valves provided with the hereinabove described hydrostatic transmission. Microswitches 182 and 183 are connected in series so as to provide a single output to an input 744 of control circuitry 100, described hereinafter in detail in conjunction with FIG. 2. A signal is provided whenever either one of the said high pressure relief valves are operated because the pressure developed in the hydrostatic transmission has reached a predetermined level. The output signals from microswitches 182 and 183 are provided to control circuitry through appropriate slip rings, not shown, coupled to a second drive terminal 16 of transmission 15.

A flywheel 17, preferably a bearing mounted high inertia member, is coupled via a fixed speed reducer 19 to a shaft 84, which is coupled via a clutch 21 to a first shaft 23. Clutches 12 and 21 may be standard electrically actuated clutches. In response to receipt of a control signal from the control circuitry, the clutch is engaged, thereby enabling torque to be transferred therethrough. If the control signal is removed, the clutch is disengaged.

In an alternative embodiment of the invention, clutches 12 and 21 may be hydraulically actuated clutches responsive to control signals in the form of oil pressures. In an embodiment of the invention, clutch 21 may be of sufficient heat dissipation capacity to allow startup of the flywheel 17 through slippage of clutch 21.

A second shaft 31 is coupled to the drive wheels of a vehicle through a conventional rear axle and differential. First and second gears 33 and 35 are provided on shaft 31 for selectable engagement therewith. Similarly there are provided gears 37 and 39 for selectable engagement with shaft 23. A gear 38 is fixedly mounted on first drive terminal 14 of continuously variable transmission 15 for rotation together therewith. A second drive terminal 16 of transmission 15 is similarly provided with a gear 40 fixedly attached thereto for rotation together therewith. The terms "first drive terminal" and "second drive terminal" may refer to either the input or output of transmission 15. In the preferred embodiment described herein, the first drive terminal is the input and the second drive terminal is the output. Selective engagement of gears 33, 35, 37 and 39 with respective shafts 23 and 31 is provided by respective synchronizing devices 42 and 44 such as VF-B lock synchronizers produced by Zahnradfabrik Friedrichshafen AG, of West Germany.

The operation of lock synchronizing device 42 is governed by synchronizer actuator 46. The operation of lock synchronizing device 44 is governed by synchronizer actuators 47 and 48. Synchronizer actuators 46, 47 and 48 act in response to control signals received from the contral circuitry.

Synchronizers 42 and 44 are normally designed to be slideable on respective shafts 23 and 31 and are conventionally controlled by actuation of a gear shift lever through appropriate mechanical linkages. In a preferred embodiment of the invention, actuators 46, 47 and 48 comprise standard electrically actuated solenoids such as Magnetshulz type GTD which move the synchronizers into desired engagement with respective gears through appropriate mechanical linkages.

In an alternative embodiment, synchronizer actuators 46, 47 and 48 may be standard hydraulically activated pistons.

Each of actuators 46, 47 and 48 may be in either an extended or retracted position. When extended, actuator 46 positions synchroniser 42 so as to couple gear 39 to shaft 23. When retracted, actuator 46 positions synchroniser 42 so as to couple gear 37 to shaft 23 and decouple gear 39 therefrom.

Actuators 47 and 48 are coupled in series such that when both actuators 47 and 48 are extended, synchronsier 44 is positioned so as to couple gear 33 to shaft 31 and to decouple gear 35 therefrom. When both actuators 47 and 48 are retracted, synchroniser 44 is positioned so as to couple gear 35 to shaft 31 and to decouple gear 33 therefrom.

When one of actuators 47 and 48 is extended and the other is retracted, synchroniser 44 is positioned in an intermediate position whereby both gears 33 and 35 are decoupled from shaft 31.

The use of synchronizers for selective gear engagement is normally limited to relatively low inertia applications. Usually, high inertia applications require the use of heavy, bulky and expensive clutches. This is due to the fact that normally, a gear to be coupled to a shaft rotates with angular velocity different from the shaft and it is therefore necessary to slow down either the gear or the shaft in order to achieve engagement. Normally this required slowing down is achieved by the use of conventional clutches whose plates are designed to have sufficient heat absorption capacity to take up the friction losses involved. It is a particular feature of this invention that lock synchronizing devices may indeed be used in this application to accomplish extremely rapid gear changes without requiring complicated controls. Thus there is provided virtually uninterrupted power flow to the drive wheels. This is due to the fact that the relative dimensions of the gears and/or the number of teeth thereon are selected so as to insure that the rotational velocities of gears and shafts to be engaged at the time of engagement are substantially identical. The selection of the gears is in accordance with the following equation:

$$\frac{\frac{D_{38}}{D_{37}}}{\frac{D_{40}}{D_{39}}} = \frac{\frac{D_{38}}{D_{33}}}{\frac{D_{40}}{D_{35}}} = \alpha$$

where $D_i$ = diameter or number of teeth of gear of index $i$ $$\alpha = \frac{\text{rotation speed of terminal 16}}{\text{rotation speed of terminal 14}}$$

at the point in time when gear engagement is to take place.

In a preferred exemplary embodiment of the invention in which continuously variable transmission 15 is the power splitting transmission described in the above reference (page 14) $\alpha = 1.35$.

It is appreciated that gears 33–40 may be replaced by friction coupling rollers or any other suitable type of coupling device provided that the above equation is substantially satisfied.

In a preferred embodiment based essentially on electric controls, inter-engagement of the various gears and shafts is verified by sensors disposed for operative association with the synchronizers on shafts 23 and 31. Sensor 50 provides an output indication of engagement of gear 37 and shaft 23; sensor 52 provides an output indication of engagement of gear 39 and shaft 23; sensor 54 provides an output indication of engagement of gears 33 and shaft 31, and sensor 56 provides an output indication of engagement of gear 35 and shaft 31. An additional sensor 58 provides an output indication of the disengagement of both gears 33 and 35 from their respective shafts. In an alternative embodiment where the control system is based essentially on hydraulic controls, the normally high reliability of hydraulic controls obviates the need for the above-mentioned sensors 50, 52, 54, 56 and 58.

The rotational velocity of shaft 23 is sensed by a sensor 176. If lock synchronizer 42 is disposed so that gear 37 is engaged to shaft 23, and clutch 12 is engaged, the analog output of sensor 176 is also proportional to the rotational speed of heat engine 10.

The rotational velocity of flywheel 17 is sensed by a sensor 60 and the rotational velocity of shaft 31, providing an indication of the velocity of the vehicle, is sensed by a sensor 62.

Sensors 78 and 80 provide output indications that the transmission ratio of transmission 15 is at one or the other of the respective extremes of its efficient range. A further sensor 82 senses when the transmission ratio is at 1:0. The transmission ratio expressed herein refer to input speed: output speed. Transmission ratio 1:0 represents the case when the first drive terminal 14 of transmission 15 rotates while the second drive terminal 16 does not rotate. In the exemplary embodiment of the invention shown and described hereinabove wherein heat engine 10 is a diesel engine, a standard mechanical fuel injector 64, typically Bosch Type APE, governs the supply of fuel to the diesel engine from a fuel tank 66 in response to control inputs received by the fuel injector.

Fuel injector 64 is conventionally controlled by a control rod which is mechanically connected to the accelerator pedal by appropriate mechanical linkages.

In a preferred embodiment of the invention, the control rod 167 is positioned by an injector actuator 69 which comprises an assembly of electrically activated solenoids 61, 63 and 65 arranged in series. The receipt of a signal from the control circuitry at any of inputs 508, 551 or 553 of respective solenoids 61, 63 and 65 causes a plunger to extend an appropriate amount which positions control rod 167 such that a predetermined amount of fuel per engine revolution is injected into heat engine 10 by fuel injector 64.

In an alternative embodiment of the invention, fuel injector 64 may be an electrically controlled or electronic fuel injector.

In a preferred embodiment of the invention, injector actuator 69 is positioned by a standard electrically controlled linear actuator 71. Linear actuator 71 may comprise an electric motor or equivalent device operative to position actuator 69 in response to a control signal. The sense and rate of change of position is a function of the polarity and amplitude of the input signal received. Upon receipt of an analog control signal at an input 555 from the control circuitry, linear actuator 71 positions injector actuator 69 and hence, control rod 167 such that the amount of fuel injected by fuel injector 64 to heat engine 10 per engine revolution can be controlled in a continuous manner subject to the analog control signal applied to said linear actuator 71.

The combination of linear actuator 71 and injector actuator 69 therefore allows the fuel injector 64 to inject either various selectable predetermined amounts of fuel or a continuously variable amount, in response to appropriate signals from the control circuitry.

Linear actuator 71 also provides an output 578 indicative of the position of injector actuator 69.

The operative transmission ratio of continuously variable transmission 15 is determined by a transmission ratio selector 67 in response to control signals received from control circuitry. In the exemplary embodiment shown wherein transmission 15 is a power splitting transmission, selector 67 comprises an electrically controllable linear actuator operative to move a slidable sleeve 169 via appropriate mechanical linkages, relative to the body of transmission 15 and along directions parallel to the longitudinal axis of shaft 14. In an alternative embodiment, selector 67 may be a controllable hydraulic piston.

Four drive controls are provided for use by an operator.

A function selector 68 has a selector lever 73 positionable in four selectable positions, LOW corresponding to a low gear drive, DRIVE corresponding to normal driving, NEUTRAL and REVERSE.

Figure 3A:
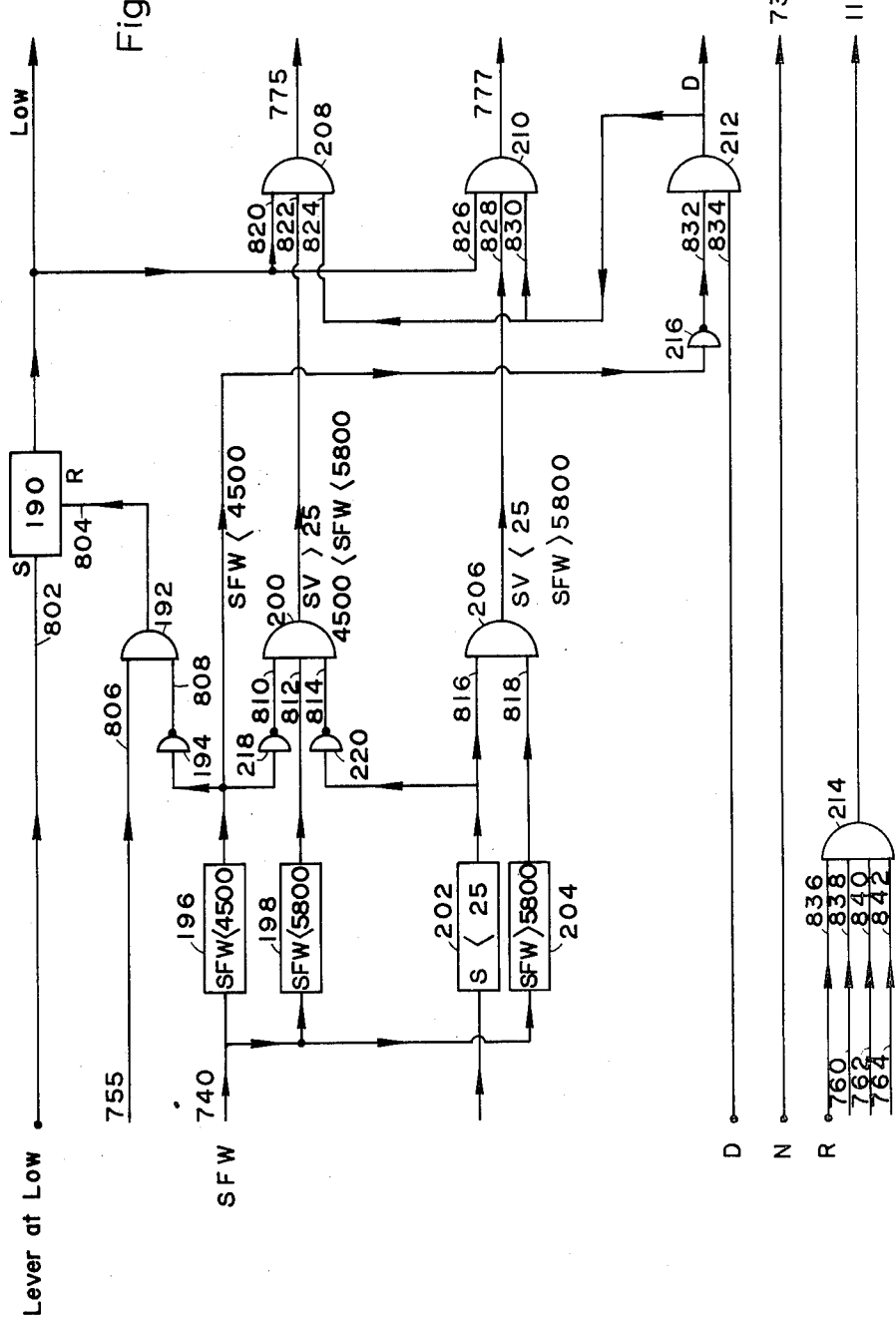
FIG. 3A shows an exemplary embodiment of a selector 68 employed in an embodiment of the invention.

Referring now to FIG. 3A, it is seen that selector 68 also receives signals at input terminals 755, 740, 742, 760, 762 and 764 respectively, from output terminal 753 of the control circuitry and sensors 60, 62, 82, 50 and 56 respectively.

Selector 68 is operative, upon positioning of lever 73 in the NEUTRAL position to provide a NEUTRAL signal, which indicates to the control circuitry that the operator desires the vehicle to be operative in NEUTRAL. The NEUTRAL signal is provided to an input terminal 502 of an AND gate 99 (FIG. 2) and to a terminal 738 of a clutch control circuit 146. Clutch control circuit 146 will be described hereinafter in connection with FIG. 2 as part of control circuitry 100.

Selector 68 includes an AND gate 214 having four inputs, 836, 838, 840 and 842. Input 836 receives a signal when lever 73 is positioned in the REVERSE position. Inputs 838, 840 and 842 receive signals from respective input terminals 760, 762 and 764. In the simultaneous presence of signals at inputs 836–842 AND gate 214 produces a REVERSE signal to control circuitry inputs 734 and 736.

The REVERSE signal is also supplied to a control input of a solenoid 119 disposed adjacent sensor 82. Solenoid 119 is operative in the absence of the REVERSE signal to prevent sleeve 169 from entering the reverse range.

Selector 68 also comprises a FLIP-FLOP circuit 190 which receives a SET signal at input 802 when lever 73 is positioned in the LOW position. FLIP-FLOP 190 also receives a RESET signal at an input 804 from the output of an AND gate 192. When in the SET state, FLIP-FLOP 190 provides a LOW signal output to input terminals 820 and 826 of respective AND gates 208 and 210 and to the LOW output of selector 68.

FLIP-FLOP circuit 190 is operative to remain in the SET state following the initial receipt of a SET signal until a RESET signal is received, regardless of the presence or absence of SET signal at terminal 802 in the interim. FLIP-FLOP 190 is therefore essentially a memory circuit which "remembers" that a SET signal has received until it is instructed to "forget" by the appearance of a RESET signal. Similar flip-flop circuits are employed extensively elsewhere in the circuitry described hereinafter.

AND gate 192 receives a signal at terminal 806, from input terminal 755 and at terminal 808, from a NAND gate 194, and provides a RESET signal to terminal 804 when signals are simultaneously present at both terminals 806 and 808. NAND gate 194 is operative to provide a signal at its output in the absence of a signal at its input, and vice versa.

The input at terminal 740 of selector 68 is provided to a level indicator 196 which provides an output signal only if the analog value of the signal at terminal 740 is less than a predetermined value corresponding to a minimum speed of flywheel 17, hereinafter referred to as "SFW ground", approximately 4500 rpm in the embodiment of the invention described herein. Level indicator 196 thus provides no signal to NAND gate 194, enabling a RESET signal to be provided at terminal 804 if a signal is present at terminal 755 and the analog value of the signal at terminal 740 represents a flywheel speed greater than SFW ground.

The output from Level Indicator 196 is also supplied to NAND gates 216 and 218.

Selector 68 also comprises an AND gate 212 which receives a signal at an input 834 when lever 73 is in the DRIVE position, and also receives a signal at an input 832 from NAND gate 216. In the simultaneous presence of signals at inputs 832 and 834 AND gate 212 provides a DRIVE signal to Control Circuitry 100.

Therefore, selector 68 is operational to provide a DRIVE signal when lever 73 is in the DRIVE position and the amplitude of the analog signal at terminal 740 is greater than SFW ground.

The output of NAND gate 218 is provided to an input terminal 810 at an AND gate 200.

The analog signal at terminal 740 is also provided to a level indicator 198. Level indicator 198 provides a signal to a terminal 812 of AND gate 200 if the analog value of the signal at terminal 740 is less than a predetermined value corresponding to a predetermined minimum speed of flywheel 17, hereinafter termed SFW min (approx. 5800 rpm in the embodiment of the invention being described herein).

The analog signal at terminal 740 is also provided to a level indicator 204, which is operative to provide a signal at a terminal 818 of an AND gate 206 if the analog value of the signal at terminal 740 is greater than SFW min.

The analog signal at terminal 742 is provided to a level indicator 202. If the analog value of the signal at terminal 742 is less than a predetermined value corresponding to a predetermined speed of the vehicle, SV switch, (approx. 25 km/hr in the present embodiment of the invention), level indicator 202 is operative to provide a signal to terminal 816 of AND gate 206 and to a NAND gate 220. The inverted output of NAND gate 220 is supplied to terminal 814 of AND gate 200.

AND gate 206 provides a signal to an input terminal 828 of AND gate 210 when signals are simultaneously present at inputs 816 and 818, i.e. provided the speed of flywheel 17 is greater than SFW min and the speed of the vehicle is less than SV switch.

AND gate 200 provides a signal at an input terminal 822 of AND gate 208 when signals are simultaneously present at inputs 810, 812 and 814, i.e. provided the speed of the vehicle is greater than SV switch, and the speed of the flywheel 17 is less than the predetermined value SFW min and above SFW ground.

The DRIVE signal from AND gate 212 is also provided to terminals 824 and 830 of respective AND gates 208 and 210.

AND gate 210 provides a signal at output terminal 777, when signals are simultaneously present at inputs 826, 828 and 830, i.e. provided that (a) a LOW signal is present, and (b) the speed of the vehicle is less than SV switch and the speed of flywheel 17 is greater than the predetermined value SWF min and (c) the operator has placed selector lever 73 in DRIVE.

AND gate 208 provides a control signal at output terminal 775 when signals are simultaneously present at inputs 820, 822 and 824, i.e. provided that (a) a LOW signal is present, and (b) the speed of the vehicle is greater than SV switch and the speed of flywheel 17 is greater than the SFW ground and less than the SFW min and (c) the operator has placed lever 73 in the DRIVE position.

Selector 68 is operative to simultaneously maintain a signal at output terminals LOW and DRIVE when a transition from operation in mode LOW to operation in DRIVE is in progress.

An accelerator pedal 70 provides an analog output to control circuitry indicating the intentions of the operator with regard to desired vehicle operation. In a preferred embodiment, the analog output is provided by a standard potentiometer which produces an analog signal substantially proportional to the amount the accelerator pedal 70 is depressed. Pedal 70 also includes switch or threshold means operative to provide an output to control circuitry which indicates the intention of the operator that movement of the vehicle is desired. In a preferred embodiment, the threshold means may be a standard electrical switch which operates when there is a predetermined minimum pressure of the foot of the operator on the pedal 70.

Brake means 72 comprising a standard brake pedal provides an analog output to control circuitry indicative of an operator's intention to decelerate. In a preferred embodiment of the invention, the analog output is provided by a standard electric potentiometer which produces an analog signal substantially proportional to the amount the brake pedal is depressed. The analog output of the brake means 72 is arranged so that the sense at the signal is always negative, so that the more the brake pedal is depressed, the smaller is the value of the analog signal. The standard electric potentiometer is connected, through appropriate mechanical linkages to the brake pedal so that normal hydraulic operation of the conventional braking system is not interfered with.

A conventional engine starting switch 74 provides a START signal to an engine starter 76 and to the control circuitry in response to a manual indication indicating desired heat engine operation. Switch 74 also provides an ON signal to input terminal 511 of the control circuitry. A standard automotive starter battery (not shown) is also connected to starter switch 74 so that operation of starter switch 74 provides the voltage of the battery to the control system.

Figure 2:
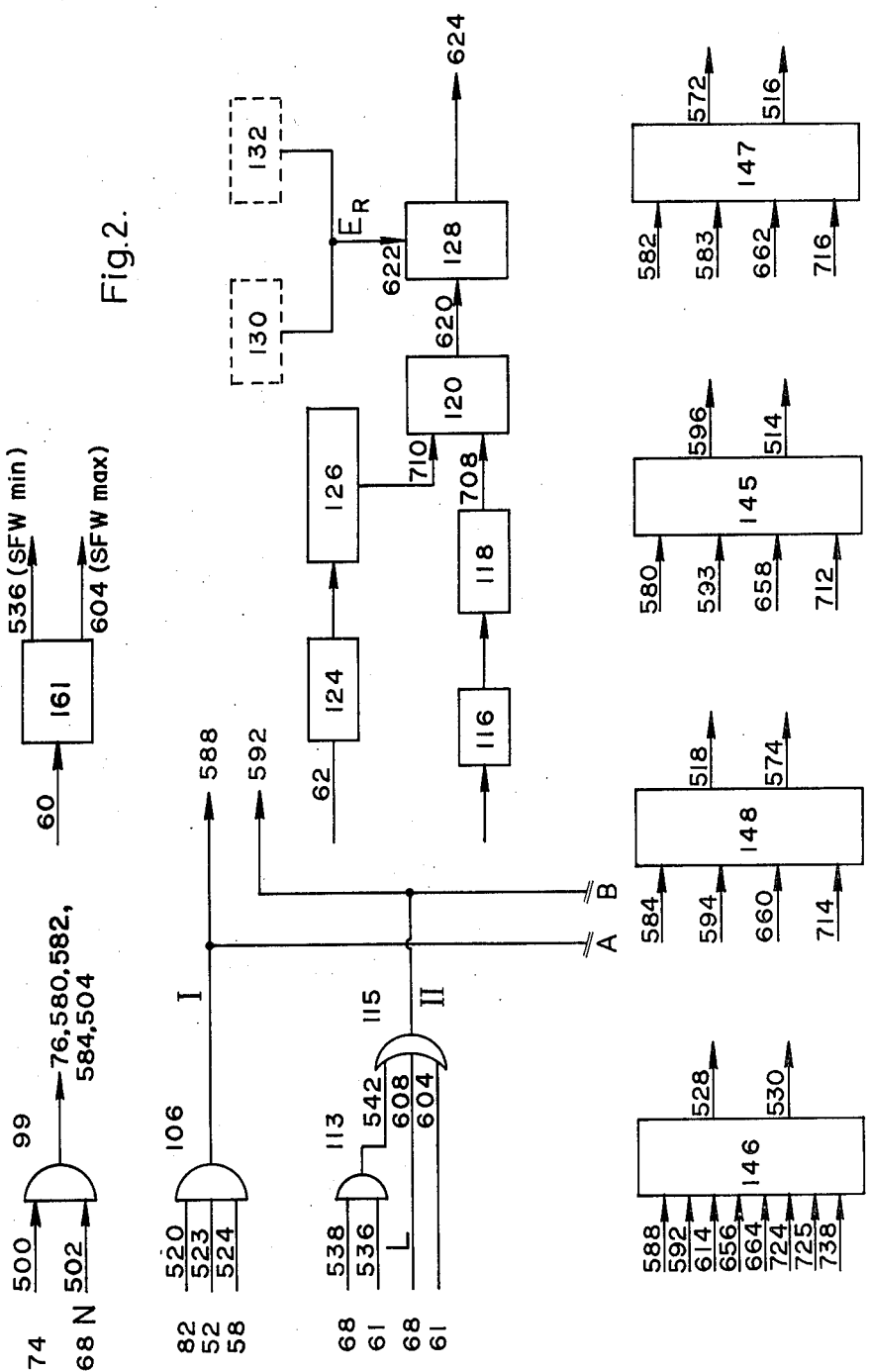
FIG. 2 is a schematic diagram of the control system employed in the embodiment of FIG. 1.

There will now be described in conjunction with FIG. 2 the structure and operation of the control system which coordinates the functioning of the continuously variable transmission means, the selective coupling means, the heat engine and the flywheel in response to operator commands and sensed parameters indicating operating conditions.

The START signal from starting switch 74 is received at terminal 500 of an AND gate 99. The NEUTRAL output signal from selector 68 is received at terminal 502 of AND gate 99. In response to simultaneous receipt of the NEUTRAL and START signals, AND gate 99 supplies an enable signal to a terminal 504 of an injector control circuit 102.

Figure 3B:
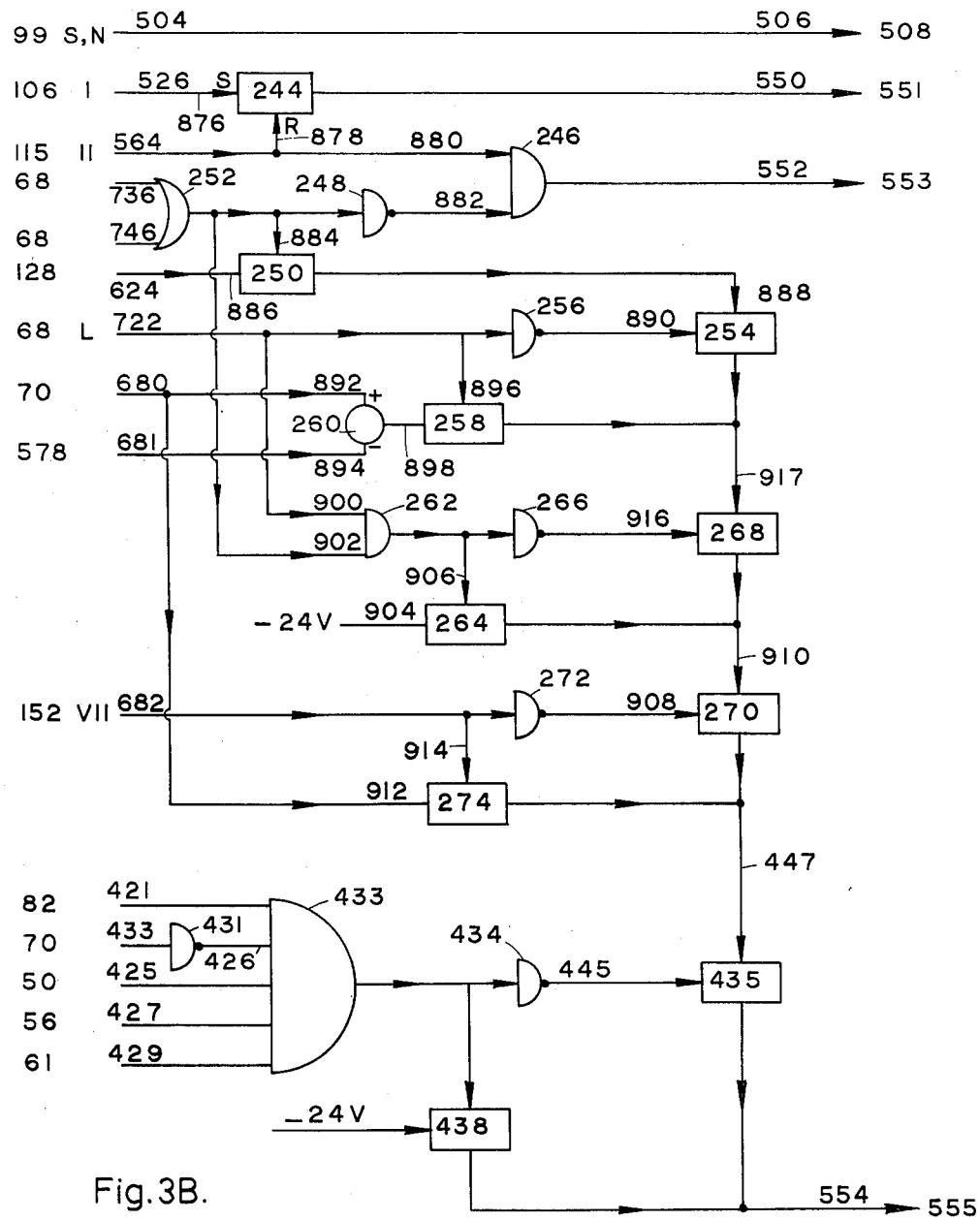
FIG. 3B shows an exemplary embodiment of injector control circuitry employed in an embodiment of the invention.

Injector control 102, illustrated in FIG. 3B, receives input signals at terminal 504 from AND gate 99, at terminal 526 from an AND gate 106 (Control Signal I), at terminal 564 from an OR gate 115 (Control Signal II), at terminal 736 from the REVERSE output terminal of selector 68, at terminal 746 from the DRIVE output terminal of selector 68, at terminal 624 from a comparator 128, at terminal 722 from the LOW output terminal of selector 68, at terminal 680 from the analog output of accelerator pedal 70, at terminal 681 from output terminal 578 of linear actuator 71, and at terminal 682 from an AND gate 152 (Control Signal VII).

Injector control 102 provides output signals at a terminal 506 to terminal 508 of solenoid 61, at a terminal 550 to terminal 551 of solenoid 63, at terminal 552 to terminal 553 of solenoid 65, and an analog output signal at terminal 554 to terminal 555 of linear actuator 71.

Input terminal 504 is coupled to output terminal 506. Terminal 526 is coupled to a SET terminal 876 of a FLIP-FLOP 244. RESET terminal 878 of FLIP-FLOP 244 is coupled to input terminal 564 which is also coupled to a terminal 880 of an AND gate 246. The output of FLIP-FLOP 244 is provided to output terminal 550.

Terminals 736 and 746 are coupled to respective inputs of an OR gate 252. The output of OR gate 252 is provided to a NAND gate 248, to a coil input 884 of a relay 250, and to a terminal 902 of an AND gate 262. The output of NAND gate 248 is provided to a terminal 882 of AND gate 246. An output signal from AND gate 246 is provided to output terminal 552 when signals are simultaneously present at inputs 880 and 882.

Relay 250 is operative, upon receipt of a signal at coil 884, to couple an input terminal 886 which receives an analog signal from terminal 624 to the output of relay 250. The absence of a signal at coil 884 causes relay 250 to open the electrical connection between input terminal 886 and the output of relay 250, thereby providing the analog value zero at the output of relay 250.

Relays are used extensively in the injector control 102 and HST control 104 to be described hereinafter and all operate substantially as described hereinabove with reference to relay 250.

Terminal 722 is coupled to a NAND gate 256, to a coil input 896 of a relay 258, and to a terminal 900 of AND gate 262. The output of NAND gate 256 is provided to a coil input 890 of a relay 254. The outputs of relays 254 and 258 are together provided to an input terminal 917 of a relay 268.

Terminal 680 is coupled to the positive terminal 892 of a comparator 260, and to an input terminal 912 of a relay 274. Terminal 681 is coupled to the negative terminal 894 of comparator 260. The output of comparator 260 is provided to an input terminal 898 of relay 258.

An output signal from AND gate 262 is provided in the simultaneous presence of signals at inputs 900 and 902 to a coil input 906 of a relay 264, and to a NAND gate 266, the output of which is provided to a coil input 916 of relay 268, whose output is supplied to an input 910 of a relay 270.

Input terminal 904 of relay 264 is connected to a negative voltage typically −24V. The output of relay 264 is provided to an input terminal 910 of relay 270.

Terminal 682 is coupled to a NAND gate 272, and to a coil input 914 of relay 274. The output of NAND gate 272 is provided to a coil input 908 of relay 270.

The outputs of relays 274 and 270 are coupled to an input terminal 447 of a relay 435. An AND gate 433 is provided with five input terminals. A terminal 421 receives an output signal from sensor 82. A terminal 426 receives a signal from accelerator pedal 70, indicating depression of the accelerator, via a NAND gate 431. A terminal 425 receives a signal from sensor 50. A terminal 427 receives a signal from sensor 56 and a terminal 429 receives a signal from indicator 161 indicating SFW min. The output of AND gate 433 is provided to a NAND gate 434 and to the coil input 443 of a relay 438. The output of NAND gate 434 is provided to a coil input 445 of a relay 435. The input terminal 441 of relay 438 is provided with an analog signal, typically −24V. The outputs of relays 435 and 438 are coupled to output terminal 554 which, in turn, is coupled to input terminal 555 of linear actuator 71.

As noted above, in response to an input signal at terminal 504, injector control 102 provides an output signal at terminal 506. The signal at terminal 506 is supplied at terminal 508 of solenoid 61 of injector actuator 69. Receipt of this signal causes the plunger of solenoid 61 to extend by a length which causes the control rod 167 of injector 64 to set the cutoff ratio, $r_c$, which determines the amount of fuel injected to the heat engine 10 for each revolution of the engine, at a value which provides sufficient fuel to start the engine. Further details of the operation of injector actuator 69 will be provided hereinafter.

Figure 3C:
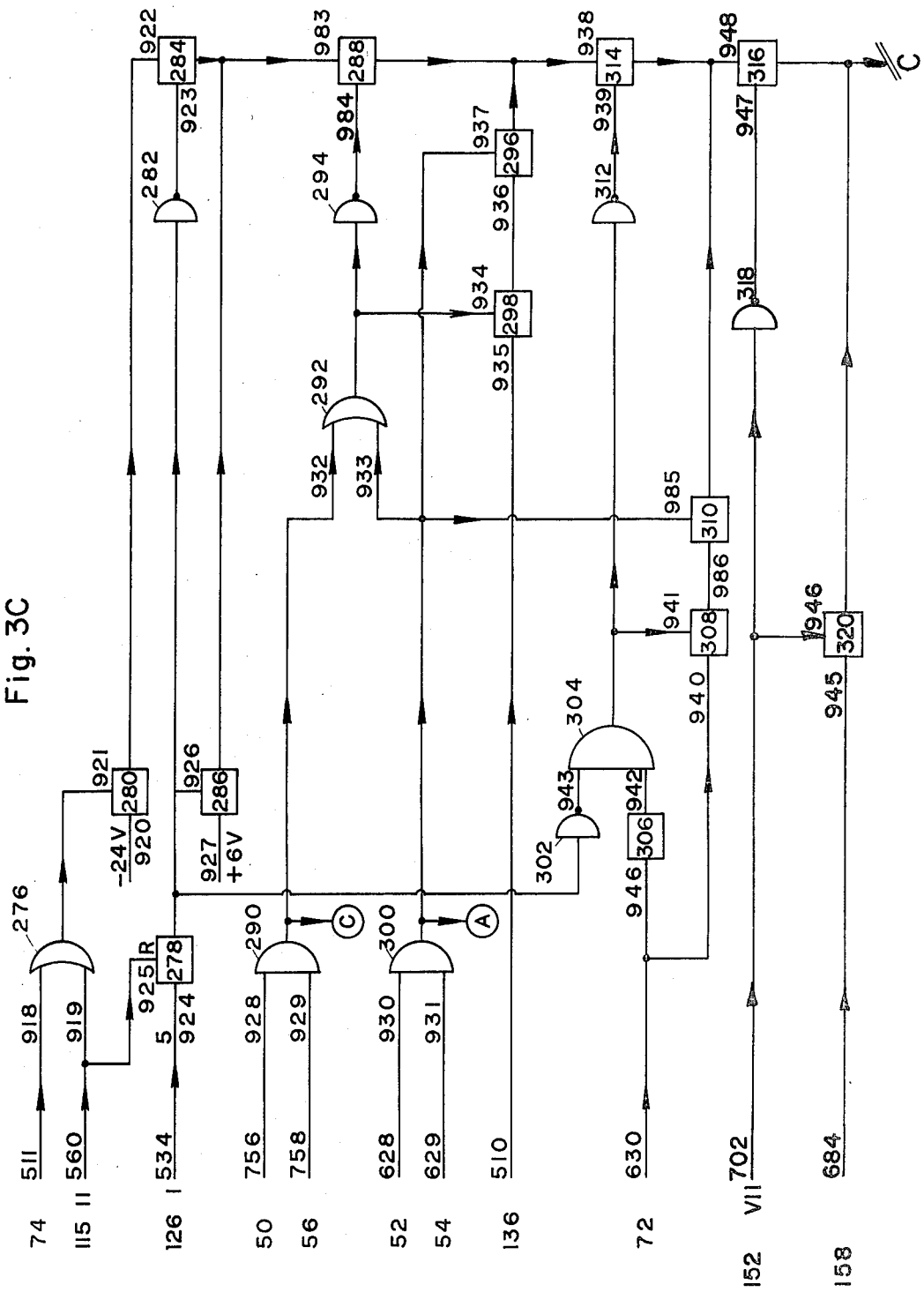
FIG. 3C shows an exemplary embodiment of hydrostatic transmission control circuitry employed in an embodiment of the invention.
Figure 3D:
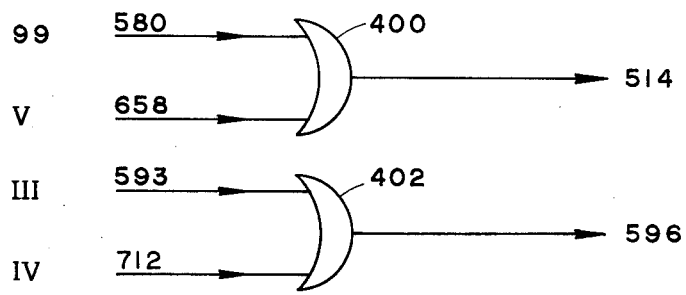
FIG. 3D shows an exemplary embodiment of synchronizer actuator control 145 employed in an embodiment of the invention.

An actuator control 145 is illustrated in FIG. 3D and comprises an OR gate 400 which receives at an input 580 a signal from the output of AND gate 99 and at an input 658 a signal hereinafter referred to as Control Signal V from an AND gate 140.

An OR gate 402 receives at respective inputs 593 and 712 a Control Signal III from an AND gate 112 and a Control Signal VI from an AND gate 138.

Actuator control 145 is operative in response to a signal at either of terminals 580 or 658 to provide an EXTEND signal to a terminal 514 of actuator 46, which is described hereinafter. Actuator control 145 is also operative in response to a control signal at either of terminals 593 or 712 to provide a RETRACT signal to terminal 596 of actuator 46. It is appreciated that the simultaneous presence of a signal at more than one of input terminals 580, 658 593 and 712 would not normally occur.

Receipt of a signal from AND gate 99 at terminal 514 of actuator 46 causes actuator 46 to extend, thereby to position synchroniser 42 so as to couple gear 39 to shaft 23 and decouple gear 37 from shaft 23.

The output of AND gate 99 is also provided to an actuator control 147 at terminal 582 and to an actuator control 148 at terminal 584.

Figure 3E:
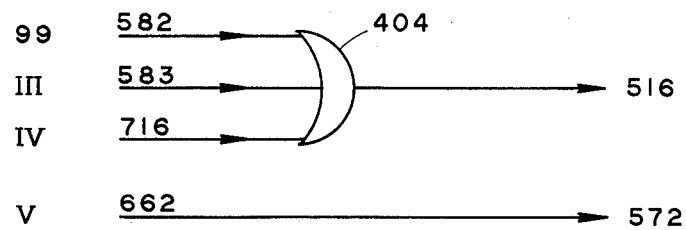
FIG. 3E shows an exemplary embodiment of synchronizer actuator control 147 employed in an embodiment of the invention.

Actuator Control 147 is illustrated in FIG. 3E and comprises an OR gate 404 whose three inputs 582, 583 and 716 receive the following inputs respectively: the output of AND gate 99; Control Signal III from AND gate 112, and Control Signal VI from AND gate 138.

In response to receipt of any of the above inputs, OR gate 404 provides a RETRACT signal to input terminal 516 of Actuator 47. Actuator Control 147 also comprises an input 662 which receives Control Signal V from AND gate 140 and supplies it as an EXTEND signal to input 572 of actuator 47.

It is noted that the simultaneous presence of a control signal at more than one of the input terminals 582, 583, 716 and 662 will not normally occur.

Figure 3F:
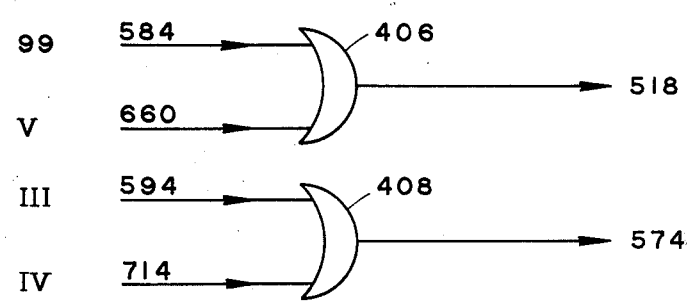
FIG. 3F shows an exemplary embodiment of synchronizer actuator control 148 employed in an embodiment of the invention.

Referring now to FIG. 3F, actuator control 148 comprises OR gates 406 and 408. OR gate 406 receives a signal from AND gate 99 at an input 584 and Control Signal V from AND gate 140 at an input 660. OR gate 406 provides an EXTEND signal to input 518 of actuator 48 in the presence of either of the above inputs.

OR gate 408 receives, at an input 594, Control Signal III from AND gate 112 and, at an input 714, Control Signal VI from AND gate 138. OR gate 408 provides a RETRACT signal to input 574 of Actuator 48 in response to receipt of either of the above inputs.

Receipt of a signal from AND gate 99 at respective terminals 516 and 518 causes actuator 47 to retract and actuator 48 to extend, such that synchroniser 44 is positioned so that neither of gears 33 and 35 are connected to shaft 31.

The ON signal from switch 74 is provided to an input terminal 511 of hydrostatic transmission control circuitry 104, hereinafter referred to as HST control.

HST control circuitry 104 illustrated in FIG. 3C, also receives input signals at a terminal 560 from OR gate 115, at a terminal 534 from AND gate 106, at a terminal 756 from sensor 50, at a terminal 758 from sensor 56, at a terminal 628 from sensor 52, at a terminal 629 from sensor 54, and at a terminal 510 from an amplifier circuit 136. HST control 104 receives the analog output from brake 72 at terminal 630 and input signals at a terminal 702 from AND gate 152, at a terminal 684 from a comparator 158, at a terminal 720 from the LOW output terminal of selector 68, at a terminal 565 from sensor 176, at a terminal 772 from sensor 62, at a terminal 776 from output terminal 777 of selector 68, at a terminal 750 from sensor 60, at a terminal 774 from output terminal 775 of selector 68, at a terminal 734 from the REVERSE output of selector 68, at a terminal 766 from sensor 82, at a terminal 744 from switches 182, 183, at a terminal 768 from an AND gate 14 and at a terminal 770 from an AND gate 138.

HST control 104 provides an output signal at terminal 753 to terminal 755 of selector 68 and an analog output signal at terminal 512 which is provided to transmission ratio selector 67.

Terminals 511 and 560 are coupled to respective inputs 918 and 919 of an OR gate 276. The output of OR gate 276 provides an output to a coil input 921 of a relay 280 when a signal is present at either of inputs 918 or 919. A negative voltage source, typically −24V, is coupled to an input terminal 920 of relay 280.

The output of relay 280 is provided to an input terminal 922 of a relay 284, whose output is provided to the input terminal 983 of a relay 288. The output of relay 288 is provided to the input 938 at a relay 314, whose output is provided to the input 948 of a relay 316. The output of relay 316 is provided to the input 950 of a relay 322, whose output is provided to the input 961 of a relay 324. The output of relay 324 is provided to the input 963 of a relay 326, whose output is provided to an input 965 of a relay 328. The output of relay 328 is provided to an input 967 of a polarity inverter circuit 330. The output of polarity inverter circuit 330 is provided to the input 969 of a relay 332 and the output of relay 332 is provided to output terminal 512.

Polarity inverter circuit 330 is operative, upon receipt of a signal at an enable terminal 968 to invert the polarity of the analog signal appearing at input terminal 967. If a signal is not present at enable terminal 968, circuit 330 is operative to pass the analog signal appearing at input terminal 967 unchanged in polarity.

Polarity inverter circuits substantially identical to circuit 330 are employed extensively in the following description and operate substantially as described above.

The input at terminal 560 is also provided to a RESET terminal 925 of a FLIP-FLOP circuit 278. The SET terminal 924 of FLIP-FLOP 278 is coupled to input terminal 534. The output of FLIP-FLOP 278 is provided to a coil input 926 of a relay 286, to a NAND gate 282 the output of which is provided to a coil input 923 of relay 284, and to a NAND gate 302, the output of which is provided to a terminal 943 of an AND gate 304.

Input terminal 927 of relay 286 is coupled to a positive voltage, typically + 6V, and the output of relay 286 is provided to input 983 of relay 288.

Terminals 756 and 758 are coupled to respective inputs 928 and 929 of an AND gate 290. The output of AND gate 290 is provided to a terminal 932 of an OR gate 292 and to an input terminal 978 of an AND gate 362.

Terminals 628 and 629 are coupled to respective inputs 930 and 931 of an AND gate 300. The output of AND gate 300 is provided to terminal 933 of OR gate 292, to enable terminal 937 of a polarity inverter circuit 296, to enable terminal 985 of a polarity inverter circuit 310 to terminal 958 of an AND gate 370, and to terminal 976 of an AND gate 356.

The output of OR gate 292 is provided to a NAND gate 294 and to coil input 934 of a relay 298. The output of NAND gate 294 is provided to coil input 984 of relay 288.

Terminal 510 is coupled to input terminal 935 of relay 298 and the output of relay 298 is provided to input terminal 936 of polarity inverter circuit 296. The output of polarity inverter 296 is provided to input terminal 938 of relay 314.

Terminal 630 is coupled to terminal 946 of a voltage detector circuit 306 and to input terminal 940 of a relay 308. Voltage detector 306 is operative to provide a signal to input 942 of AND gate 304. When a signal of non-zero amplitude is received at input 946 the output of voltage detector 306 is provided to terminal 942 of AND gate 304. The output of AND gate 304 is provided to coil 941 of relay 308 and to a NAND gate 312, whose output is provided to coil input 939 of relay 314. The output of relay 308 is provided to input terminal 986 of polarity inverter 310, whose output is provided to input 948 of relay 316.

Terminal 702 is coupled to a NAND gate 318 whose output is provided to a coil input 947 of relay 316, and to coil input 946 of a relay 320.

Terminal 684 is coupled to input 945 of relay 320 and the output of relay 320 is provided to input 950 of relay 322.

Terminal 720 is coupled to a NAND gate 334 whose output is provided to coil input 949 of relay 322, to coil input 952 of a relay 336, and to terminal 957 of AND gate 370.

Terminal 565 is coupled to the positive input 955 of a comparator 340 and to the positive input 981 of a comparator 354.

The negative input 956 of comparator 340 receives one of two predetermined analog signals, S engine (3200 rpm in the present embodiment) and S engine high (3500 rpm in the present embodiment) from circuitry which will now be described. A level indicator 400 receives at an input terminal 401 an analog signal from terminal 578 of injector actuator 69. Indicator 400 provides an output signal to a terminal 404 of an AND gate 406 if the value of the signal received at indicator 400 is zero. AND gate 406 also receives a signal at a terminal 408 from terminal 720. The output of AND gate 406 is provided to a NAND gate 410 and to a coil 412 of a relay 414. The output of NAND gate 410 is provided to a coil 416 of a relay 418. The input terminal of relay 418 is connected to a predetermined voltage S engine and the input terminal of relay 414 is connected to a predetermined voltage S engine high. The respective outputs of relays 418 and 416 are coupled to terminal 956 of comparator 340.

The output of comparator 340 is provided at an input terminal 953 of a polarity inverter circuit 330, whose output is provided to input 951 of relay 336 whose output is in turn supplied to input 961 of relay 324.

Terminal 772 is coupled to a level indicator 342. Level indicator 342 is operative, upon receipt of an analog signal whose magnitude is less than a predetermined value SV min, which represents a predetermined minimum speed of the vehicle (approximately 10 km/hr in the present embodiment of the invention), to provide a signal to an enable terminal 954 of polarity inverter 330. If the analog value of the signal at the input of indicator 342 is above the predetermined value SV min, level indicator 342 is operative to remove the signal from enable terminal 954.

The output of AND gate 370 is provided to a NAND gate 346 and to coil input 960 of a relay 344. The output of NAND gate 346 is provided to coil input 962 of relay 324. Input terminal 959 of relay 344 is provided with a predetermined positive voltage, typically +24V. The output of relay 344 is provided to input 963 of relay 326.

Terminal 776 is coupled to an input terminal 987 of an OR gate 350. OR gate 350 also receives an input signal at input 988 from the output of AND gate 356. AND gate 356 receives inputs at respective input terminals 975 and 976 from terminal 774 and from the output of AND gate 300 respectively. The output of OR gate 350 is provided to coil input 972 of a relay 352 and to a NAND gate 348, whose output in turn is provided to coil input 964 of relay 326.

Terminal 750 is coupled to the negative input 982 of comparator 354 whose positive input receives a signal from terminal 565. The output of comparator 354 is provided to an input 971 of relay 352. The output of relay 352 is provided to input 965 of relay 328 and to a speed matching circuit 358.

Speed matching circuit 358, which may be a conventional comparator, and threshold detector combination is operative to provide a control signal to output terminal 753 upon receipt of an analog signal whose absolute value is less than a predetermined value, Sslip, which represents the maximum allowable energy dissipation of clutch 21 per engagement (10 BTU per engagement in the present embodiment of the invention).

Terminal 774 is also coupled to terminal 977 of AND gate 362, which also receives an input from the output of AND gate 290. The output of AND gate 362 is provided directly to coil input 973 of a relay 364 and via a NAND gate 360 to coil input 966 of relay 328.

Input 974 of relay 364 is provided with a predetermined positive voltage, typically +24V. The output of relay 364 is provided to input 967 of polarity inverter 330.

Terminals 734 and 766 are provided to respective terminals 979 and 980 of an AND gate 366. The output of AND gate 366 is provided to enable terminal 968 of polarity inverter 330.

Terminals 744, 768 and 770 are provided to respective terminals of a NOR gate 368. The output of NOR gate 368 is provided to coil input 970 of relay 332.

HST control circuitry 104 is operative, upon receipt of an ON signal at terminal 511, to supply the negative voltage appearing at terminal 920 of relay 280, through activated relays 280, 284, 288, 314, 316, 322, 324, 326, 328, and 332 to output terminal 512. The actuation of the above mentioned relays 280, 284, 288, 314, 316, 322, 324, 326, 328 and 332 in response to a control signal at terminal 511 will be explained hereinafter.

HST control 104 is also operative, upon receipt of a control signal at terminal 534, hereinafter referred to as Control Signal I, to provide the positive voltage appearing at terminal 927 of relay 286, through activated relays 286, 288, 314, 316, 322, 324, 326, 328 and 332 to output terminal 512. The actuation of the above mentioned relays 286, 288, 314, 316, 322, 324, 326, 328 and 332 in response to receipt of a Control Signal I at terminal 534 will be explained hereinafter.

HST control 104 is also operative, upon receipt of a control signal at terminal 560, hereinafter referred to as Control Signal II, to remove from output terminal 512 the positive voltage signal supplied from terminal 927 of relay 286 and to supply to output terminal 512 the negative voltage from terminal 920 of relay 280.

HST control 104 is also operative, upon simultaneous receipt of control signals at terminals 756 and 758 to provide the analog voltage appearing at terminal 510 to output terminal 512, through activated relays 298, 314, 316, 322, 324, 326, 328 and 332.

HST control 104 is also operative, upon simultaneous receipt of control signals at terminals 628 and 629 to operate essentially as described hereinabove for operation in response to control signals at terminals 756 and 758, except that the polarity of the analog signal supplied at terminal 510 is inverted by polarity inverter 296 before being supplied to output terminal 512. HST control 104 is also operative, upon receipt of an analog signal other than zero at terminal 630 and when FLIP-FLOP 278 is in its RESET state to provide the analog signal at terminal 630 to output terminal 512 via activated relays 308, 316, 322, 324, 326, 328 and 332. The polarity of the analog signal input at terminal 630 is inverted by polarity inverter 310 in response to receipt of a signal from the output of AND gate 300. If no signal is present at enable input 985 of polarity inverter 310, the signal is passed with no change of polarity. Relay 314 is also simultaneously deactivated thereby cutting off the analog voltage appearing at terminal 510 from output terminal 512.

The above description of the response of HST control 104 to the presence or absence of control signals at terminals 756, 758, 628, 629, 510 and 630 relates to the operation of HST control 104 in operational modes I and II.

HST control 104 is also operative, in response to the presence at terminal 702 of a control signal, hereinafter referred to as Control Signal VII indicating operation in the Highway Mode to couple the analog signal appearing at terminal 684 to output terminal 512, via activated relays 320, 322, 324, 326, 328 and 332.

HST control 104 is also operative, in response to the presence at terminal 720 of the LOW signal indicating operation in the Low Mode to provide, via activated relays 336, 324, 326, 328 and 332 to output terminal 512, an analog signal whose analog value represents the difference between the signal appearing at terminal 565 and the reference to analog signal S engine or S engine high appearing at terminal 956. The polarity of the signal output of comparator 340 is reversed by polarity inverter 330 when the analog level of the signal received at input 772 is less than the threshold SV min. established by level indicator 342.

Comparator 354 is operative in response to the presence of a signal at terminal 776, indicating the occurrence of a transition from LOW MODE operation to Mode I operation to provide an analog signal to output 512 via actuated relays 352, 328 and 332. The analog value of this signal represents the difference between the analog signal appearing at terminal 565 and the analog signal appearing at terminal 750.

HST control 104 is also operative, upon simultaneous receipt of signals from inputs 756 and 758 and of a signal at terminal 774 indicating the occurrence of a transition from LOW MODE operation to Mode II operation, to supply the positive voltage +24V appearing at terminal 974 of relay 364 via activated relays 364 and 332 to output terminal 512 until the simultaneous receipt of signals at inputs 628 and 629 confirming coupling in Mode II. At this point a control signal at the output of AND gate 300 accompanied by the elimination of the signal inputs at terminals 756 and 758 causes the analog value at the output of comparator 354 to replace the positive voltage at output terminal 512.

HST control 104 is also operative, in response to the simultaneous presence of a REVERSE signal at terminal 734 and a signal at terminal 766, to invert the polarity of the analog signal appearing at input terminal 967 of an inverter 330, thereby enabling operation in REVERSE.

HST control 104 is also operative, upon receipt of a control signal at either of terminals 744, 768 or 770 to deactivate relay 332 thereby providing a zero level signal to output terminal 512.

A −24V output signal from output terminal 512 of HST control is provided to hydrostatic transmission ratio selector 67 in response to receipt of the ON signal from switch 74. Receipt of this signal instructs selector 67 to set the transmission ratio at 1:0. Sensor 82 provides an output indication verifying that the transmission ratio is set at 1:0.

The gear coupling arrangement provided in response to the output signal from AND gate 99 described hereinabove in which gear 39 is coupled to shaft 23, gear 37 is decoupled from shaft 23 and gears 33 and 35 are both decoupled from shaft 31 will hereinafter be referred to as coupling for operation in the Starting Mode. Verification of this coupling arrangement at shafts 23 and 31 is provided by the outputs of sensors 52 and 58.

The output signal from sensor 82 confirming setting of the transmission ratio at 1:0 is received at an input terminal 520 of an AND gate 106. Outputs of sensors 52 and 58 which confirm the desired gear coupling for operation in the Starting Mode are received at respective inputs 523 and 524 of AND gate 106.

The output of AND gate 106, hereinafter referred to as Control Signal I, is provided when the signals at terminals 520, 523 and 524 are simultaneously received.

The provision of Control Signal I at the output of AND gate 106 indicates that (a) the transmission ratio of transmission 15 is at 1:0, and (b) the gear coupling arrangement is disposed for operation in the Starting Mode.

Control Signal I is supplied to an input terminal 526 of injector control circuitry 102.

Injector control 102 is operative, upon receipt of Control Signal I at terminal 526, to provide a signal to the set terminal 876 of FLIP-FLOP 244, which provides a signal at output terminal 550 to input 551 of solenoid 63 until receipt of Control Signal II at terminal 564 which resets FLIP-FLOP 244. The output signal at terminal 506 terminates when the driver allows switch 74 to return from the START position to the ON position.

Signal I is also supplied to clutch controller 146 at terminal 588.

Figure 3G:
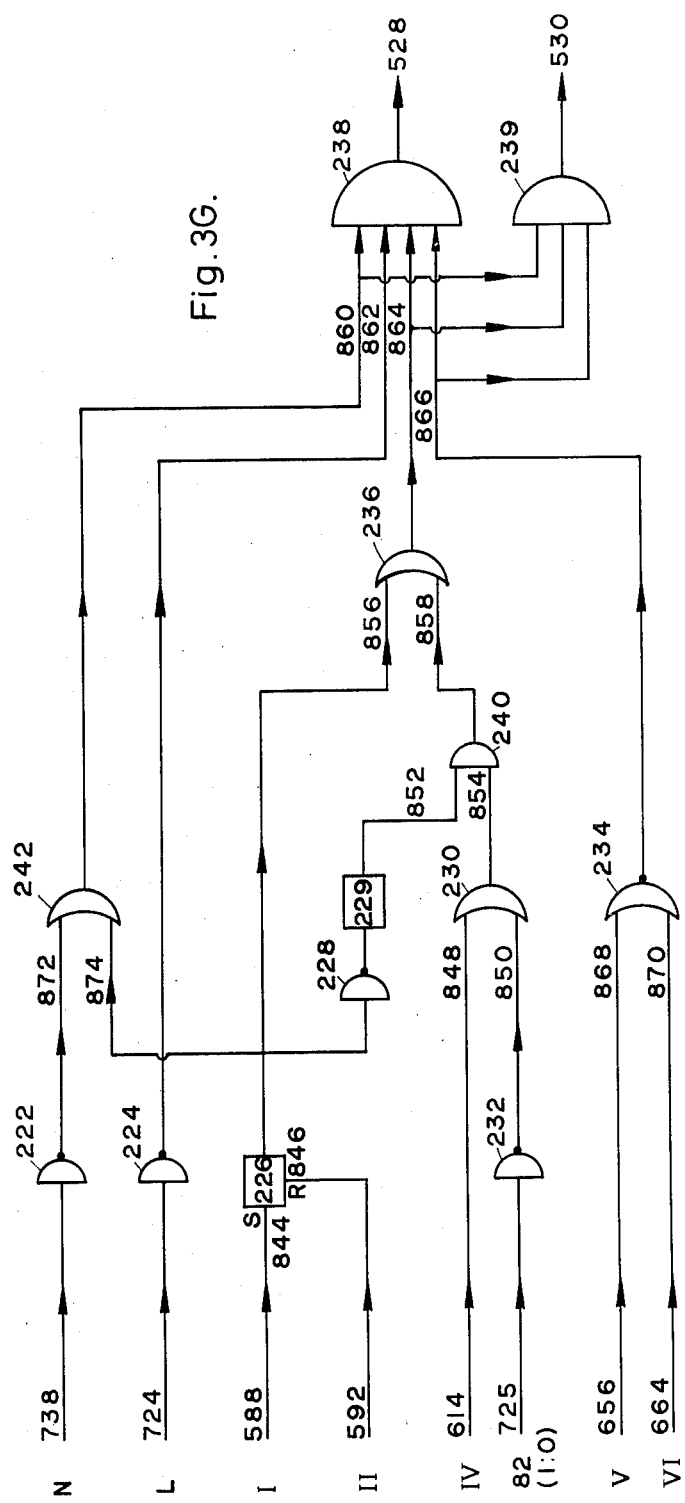
FIG. 3G shows an exemplary embodiment of clutch controller 146 employed in an embodiment of the invention.

Clutch controller 146 is illustrated in FIG. 3G and comprises AND gates 238 and 239 which provide control signals to respective clutches 21 and 12 at respective input terminals 528 and 530.

AND gate 238 has four inputs. A first input 860 is received from an OR gate 242. Or gate 242 receives one input at a terminal 872 via a NAND gate 222 from the NEUTRAL output of selector 68 (input terminal 738). Or gate 242 also receives an input from the output of FLIP-FLOP 226 which receives at a SET input 844, control signal I from AND gate 106 (input terminal 588) and at a RESET input 846, Control Signal II from OR gate 115 (input terminal 592).

A second input 862 to AND gate 238 is received from the LOW output of selector 68 (input terminal 724) via a NAND gate 224. A third input 864 to AND gate 238 is received from the output of an OR gate 236. OR gate 236 receives an input 856 from the output of FLIP-FLOP 226 and a second input from an AND gate 240. AND gate 240 receives a signal at an input 852 via a delay circuit 229 and a NAND gate 228 from the output of FLIP-FLOP 226 and a signal at a second input 854 from an OR gate 230. OR gate 230 receives, at a first input 848, Control Signal IV (input terminal 614) from an AND gate 101 and a signal at an input 850 from sensor 82 (input terminal 725) via a NAND gate 232.

The fourth input 866 to AND gate 238 is received from a NOR gate 234. The two inputs 868 and 870 of NOR gate 234 respectively receive Control Signal V from AND gate 140 (input terminal 656) and Control Signal VI from AND gate 138 (input terminal 664).

AND gate 239 has three inputs coupled to respective inputs 860, 864 and 866 of AND gate 238.

It is apparent that in order for a signal to be provided to input 528 of clutch 21, causing engagement of clutch 21, signals must be simultaneously present at inputs 860, 862, 864 and 866 of AND gate 238. The presence of a NEUTRAL signal at input terminal 738 thus prevents the engagement of clutch 21 unless FLIP-FLOP 226 is in the SET state.

Receipt of control signal I indicating gear coupling for operation in the Starting Mode places FLIP-FLOP 226 in the SET state and FLIP-FLOP 226 remains SET until a RESET signal, provided by control signal II and indicating the completion of flywheel energization, is received by FLIP-FLOP 226.

Receipt of a LOW signal at input 724 prevents the provision of a signal to input 862 and therefore prevents engagement of clutch 21.

The required signal input to input terminal 864 of AND gate 238 is provided either when FLIP-FLOP 226 is in a SET state or at least a predetermined time after reset of FLIP-FLOP 226 and either in the presence of a control signal IV indicating, gear coupling for operation in first gear and depression of the accelerator pedal, or in the absence of a signal from sensor 82 thus indicating the transmission ratio of transmission 15 is not set at 1:0.

The predetermined amount of time after reset of FLIP-FLOP 226 during which no signal is provided to input 864 is governed by delay 229 and is selected to be approximately one second in the present embodiment, sufficient to permit a transition from gear coupling in the Starting Mode to gear coupling in the first mode of operation.

The fourth required signal input to input terminal 866 is provided in absence of control signals V and VI, such absence indicating that a transition in either direction between respective operational modes 1 and 2 is not in progress.

In summary clutch 21 is engaged only under the following conditions:

1. a transition in either direction between operational modes I and II is not in progress; and
2. a LOW signal is not being received; and
3. either:
   a. a NEUTRAL signal is not being, received; or
   b. the gear coupling is arranged for operation in the STARTING mode and flywheel energization is not complete; and
4. either:
   a. the gear coupling is arranged for operation in the starting mode and flywheel energization is not yet complete; or
   b. at least a fixed time (typically one second) after completion of flywheel energization has elapsed and either (i) control signal IV is received indicating coupling for operation in the first mode of operation and depression of the accelerator pedal; or
(ii) the gear ratio is not set at 1:0.

AND gate 239 does not receive an input from the LOW signal via a NAND gate 224. Thus AND gate 239 provides an output signal to input terminal 530 of clutch 12, whenever aforementioned conditions 1, 3 and 4 are satisfied.

Following provision of Control Signal I, receipt of a signal at terminal 588 of Clutch Control 146 results in the provision of a signal to terminals 528 and 530 of clutches 21 and 12 respectively, thereby engaging both clutches.

The vehicle is now disposed for power flow in the Starting Mode. The gear coupling arrangement for power flow in the Starting Mode is illustrated schematically in FIG. 4A. The power produced by heat engine 10 passes via clutch 12 to first drive terminal 14, via transmission 15 to second drive terminal 16, via gear 40, gear 39, shaft 23, clutch 21, shaft 84, and reductor 19 to flywheel 17.

Receipt of a signal at input 551 in response to provision of Control Signal I causes the plunger of the solenoid 63 to extend by a length $L_3$, which in turn causes the control lever 167 of fuel injector 64 to set the cutoff ratio $r_c$ at a value which supplies fuel to heat engine 10 at a rate whereby it can produce a substantial portion of its maximum power.

Hydrostatic transmission control circuitry 104 is operative in response to receipt of control signal I to provide a constant analog output signal at output 512 to ratio selector 67 thereby effecting a change in the transmission ratio of transmission 15 from the ratio 1:0 at a predetermined rate for acceleration of the flywheel 17. The predetermined rate may be selected such that sufficient time is allowed for the heat engine to speed up to its desired rotational velocity after clutches 12 and 21 are engaged.

The flywheel is speeded up to a desired rate of rotation, typically above 5800 rpm. The speed of rotation is monitored by sensor 60 which produces an analog signal SFW proportional to the speed of the flywheel. The signal SFW is supplied to a threshold indicator 161. When the magnitude of signal SFW reaches a predetermined minimum value, SFW min, (determined by the minimum speed at which heat engine 10 can produce useful amounts of torque and typically 5800 rpm), an enable signal is supplied by indicator 161 to terminal 536 of an AND gate 113.

When SFW reaches a predetermined higher speed SFW max which is the maximum desired speed of flywheel rotation, typically 7200 rpm, indicator 161 provides an output signal to input 604 of an OR gate 115.

The DRIVE signal from selector 68 is supplied to a terminal 538 of AND gate 113, and to a terminal 540 of an OR gate 122. The LOW signal from selector 68 is also supplied to terminal 543 of OR gate 122. The output of OR gate 122 is in turn supplied to terminal 541 of an AND gate 112. The output of AND gate 113, indicating that the flywheel has reached its minimum speed and that the operator wishes to operate the vehicle in drive, is supplied to a terminal 542 of OR gate 115.

As noted above the LOW signal from selector 68 and the SFW max output of indicator 161 are supplied to respective inputs 608 and 604 of OR gate 115.

The output of OR gate 115, herein referred to as Control Signal II is supplied at terminal 592 of clutch control 14.

Control Signal II indicates that (a) lever 73 of selector 68 is in DRIVE and the flywheel 17 has reached a minimum rotational speed (5800 rpm in the present embodiment), or (b) selector 68 is in LOW, or (c) the flywheel 17 has reached its maximum rotational speed (7200 rpm in the present embodiment).

Control signal II is also supplied to terminal 560 of HST control circuit 104. In response to receipt of this signal, HST control circuitry 104 provides an analog signal typically −24V at output 512 thereof for the purpose of reducing the transmission ratio to 1:0 at a relatively fast rate. Attainment of this ratio is verified by sensor 82, whose output is supplied at terminal 562 of AND gate 112.

Control signal II is also supplied to terminal 564 of injector control 102. Control Signal II operates to reset FLIP-FLOP 244 and thus to eliminate the signal at terminal 550 of injector control 102. In response to receipt of signal II and in the absence of DRIVE or REVERSE Signals from selector 68, injector control 102 supplies a signal to terminal 553 of solenoid 65. Receipt of this signal at solenoid 65 causes the plunger of solenoid 65 to extend by a length $L_5$ which causes the control lever 167 of fuel injector 64 to set the cutoff ratio $r_c$ at a value which supplies fuel to heat engine 10 at a rate whereby the engine can rotate at an idling speed.

Control signal II is also supplied to input 566 of AND gate 112. The output of AND gate 112, hereinafter referred to as control signal III, is supplied to input terminal 593 of actuator control 145. Provision of control signal III at the output of AND gate 112 indicates that (a) the transmission ratio of transmission 15 is at 1:0, (b) selector 68 is in DRIVE or LOW, and (c) control signal II is being provided. Receipt of signal III at terminal 593 causes actuator control 145 to produce a RETRACT signal at terminal 596 of actuator 46 and meanwhile the EXTEND signal at terminal 580 is eliminated. Receipt of a signal at terminal 596 causes actuator 46 to retract, thereby positioning synchroniser 42 so as to engage gear 37 to shaft 23 and disengage gear 39 from shaft 23. Verification of this engagement is provided by sensor 50, whose output is supplied at input 600 of an AND gate 101.

Control signal III is also supplied to terminal 594 and 583 of respective actuator control 148 and 147 causing actuator control 148 and 147 to produce signal at respective input terminal 574 and 516 of actuators 48 and 47. The signals at input terminals 518 and 572 of actuator 48 and 47 meanwhile are eliminated. Receipt of signals at terminals 574 and 516 causes actuators 48 and 47 to retract, thereby positioning synchroniser 44 so as to engage gear 35 to shaft 31. Verification of this engagement is provided by sensor 56, whose output is supplied to an input 602 of AND gate 101.

The gear coupling arrangement described hereinabove will hereinafter be referred to as coupling for operation in mode I.

As described hereinabove, accelerator 70 is provided with a sensor indicating that the operator has applied pressure to the accelerator pedal 70 and hence wishes to move the vehicle. An output signal from this sensor is provided at input 610 of AND gate 101.

The output of AND gate 101, hereinafter referred to as control signal IV, indicates: (a) the engagement of gears 37 and 35 for operation in mode I, and (b) provision of a signal from the sensor on accelerator pedal 70 to input 610 of AND gate 101. Control signal IV is applied to input 614 of clutch controller 146 causing controller 146 to engage clutches 12 and 21.

Coupling of clutches 12 and 21, and the aforementioned coupling arrangement for operation in mode I defines a power train whereby flywheel 17 is coupled via fixed speed reducer 19 shaft 84, clutch 21, first shaft 23, gears 37 and 38 to first drive terminal 14; heat engine 10 is coupled by clutch 12 to first drive terminal 14; and second drive terminal 16 is coupled via gears 40 and 35 and shaft 31 to the drive wheels of the vehicle. This power train will hereinafter be referred to as the power train for operation in mode I and is illustrated schematically in FIG. 4B.

The analog output from accelerator 70 is received at positive input 616 of a comparator 114. The analog output from accelerator 70 represents the demand of the operator for torque to drive the vehicle. The demanded acceleration torque at input 616 of comparator 114 is compared in comparator 114 with a signal received at the negative input 556 from output terminal 554 of injector control 102 representing cutoff ratio $r_c$ which, as noted above, determines the amount of fuel injected to the engine per engine revolution. This cutoff ratio is substantially proportional to the torque produced by the heat engine 10 at a given time. The output of comparator 114 is the algebraic sum of the analog value appearing at input 616 minus the analog value appearing at input 556.

The output of comparator 114 is supplied to input 618 of an accelerator amplifier 136 whose output is in turn supplied to terminal 510 of HST control circuitry 104.

Amplifier 136 comprises three parallel circuit branches coupled to terminal 618 across a resistor $R_1$. The first branch comprises a diode $D_1$ and a resistor $R_2$ arranged to permit current flow from the resistor $R_2$ to diode $D_1$. The second branch comprises a diode $D_2$ arranged for current flow in a direction opposite of that of $D_1$, and a resistor $R_3$. The value of resistor $R_3$ is greater than the value of resistor $R_2$. The third branch comprises an operational amplifier 186. The junction of resistors $R_2$ and $R_3$ and the output of amplifier 186 is coupled via an inverter 135 to input 510 of HST control circuitry.

In order to make the vehicle "feel" similar to a conventional automobile, if the output of comparator 114 is positive, amplifier 136 amplifies the signal at 618 by an amount R3/R1. (If the signal at terminal 618 is positive, diode D1 renders resistor R2 inoperative in determining the gain of amplifier 136). The signal at terminal 618 amplified by R3/R1 is applied at input 510 of HST control circuit 104 to cause selector 67 to operate at a rate which increases the transmission ratio of transmission 15, thereby increasing the speed of the vehicle, at a rate which is nearly proportional to the difference between the demanded torque appearing at the output of accelerator pedal 70 and the actual engine torque represented by $r_c$.

If the output of comparator 114 is negative, amplifier 136 amplifies the signal at terminal 618 by R2/R1. The signal at terminal 618 multiplied by R2/R1 is applied at input 510 of HST control circuit 104 to cause selector 67 to operate at a rate which decreases the transmission ratio of transmission 15, thereby decreasing the speed of the vehicle, at a rate which is nearly proportional to the difference between the demanded torque appearing at the output of accelerator pedal 70 and the actual engine torque represented by $r_c$. Because the gain R2/R1 is less than the gain R3/R$_1$, a signal to decrease the transmission ratio, caused by decreasing pedal pressure, results in a rate of deceleration smaller than the corresponding rate of acceleration produced by a signal of equal magnitude and opposite sign at terminal 618. The magnitude of R2/R$_1$ may be adjusted so that the "feel" of the vehicle is made substantially identical to the "feel" of a conventional vehicle.

It is noted that the torque demand indicated by the analog signal output of accelerator 70 does not directly affect the amount of fuel injected into the engine but rather results in a variation of the transmission ratio of hydrostatic transmission 15.

In accordance with an embodiment of the present invention, there is provided constant monitoring of the rotational kinetic energy of the flywheel and of the translational kinetic energy of the entire vehicle.

Flywheel rotational kinetic energy is determined by supplying the analog output SFW of sensor 60, which senses the rotational velocity of flywheel 17, to a standard electronic squaring circuit 116, the output of which is then supplied to a standard electronic multiplier 118, which multiplies the squared rotational velocity of the flywheel by I/2 where I equals the moment of inertia of the flywheel. The output of multiplier 118, which represents the rotational kinetic energy of the flywheel, is supplied to input terminal 708 of a summing circuit 120.

The translational kinetic energy of the entire vehicle is determined by supplying the analog output of sensor 62, which measures the rotational velocity of output shaft 31 and converts it to an analog signal, SV, which is proportional to the translational velocity of the vehicle, to a standard electronic squaring circuit 124 whose output is supplied to a standard electronic multiplier which multiplies the signal representing the square of the velocity of the vehicle by a constant representing one half of the usual mass of the vehicle. In an alternative embodiment of the invention, means may be provided to estimate the actual mass of the vehicle to account for changing loading conditions of the vehicle. The output of multiplier 126, which represents the translational kinetic energy of the vehicle, is supplied to an input 710 of summing circuitry 120.

The output of summing circuit 120 substantially represents the total kinetic energy of the system at any given time. According to a first embodiment of the invention the output of summing circuitry 120 is supplied at negative input 620 of a comparator 128. At positive input 622 of comparator 128, an input representative of the reference kinetic energy for the moving system is received. The reference kinetic energy, $E_r$, may be a fixed reference equal to the kinetic energy of the system with the flywheel fully energized and the vehicle at rest, supplied by an electronic reference circuit 130. According to an alternative embodiment of the invention, the reference may be provided by a sample and hold circuit 132 which samples the output of summer 120 at a predetermined sampling rate, holds this value, and supplies it to comparator 128 until the next sampling.

According to a further alternative embodiment of the invention comparator 128 may be replaced by a standard electronic differentiating circuit 129 producing an output representing the instantaneous rate of change of total kinetic energy of the system.

The output of comparator 128, or in an alternative embodiment, of the energy differentiator, is supplied to an input terminal 624 of injector control circuitry 102.

If the signal at input 624 of injector control 102 is negative, injector control 102 provides a control signal $r_c$ at output 554 which decreases the cutoff ratio, thereby decreasing the fuel supply per engine revolution and hence the torque output of heat engine 10.

When the output of comparator 128 is positive, injector control circuitry 102 is operative to increase the cutoff ratio and thereby increase the torque output of heat engine 10.

The analog output of brake 72 is received at terminal 630 of HST control circuitry 104. The magnitude of the signal at terminal 630 is proportional to the pressure of the brake pedal and hence is proportional to the desire of the operator to decelerate the vehicle. The signal at terminal 630 appears at output terminal 512 of HST control circuit 104, to decrease the transmission ratio of transmission 15 and thereby decrease the speed of the vehicle.

The maximum value of the analog signal at terminal 630 corresponds to the maximum rate at which the transmission ratio of transmission 15 can be changed in a direction to reduce the speed of the vehicle without transmission 15 being overloaded.

This maximum value at input 630 is provided by pedal 72 disposed at an angle whereby the conventional braking system has not yet been activated. Any further pressure on brake pedal 72 will not increase the rate at which the transmission ratio of transmission 15 is changed but instead will activate the conventional braking system.

Transitions from mode I to mode II are automatically effected by the control circuitry provided in accordance with an embodiment of the invention.

Sensor 80 is activated when the transmission ratio of transmission 15 reaches the end of its efficient range (1:1.34 in the present embodiment) and provides an output to terminal 632 of an AND gate 140 and to terminal 635 of AND gate 138.

The analog output of comparator 114 is also provided at input terminal 642 of a threshold circuit 171. If the magnitude of the signal at terminal 642 is greater than or equal to a predetermined positive value, indicating a definite desire by the operator to accelerate the vehicle, threshold circuit 171 provides an output signal to an input terminal 636 of AND gate 140. If an output of threshold circuit 171 is provided, and the value of the analog signal at terminal 642 subsequently drops below the predetermined value, the output of circuit 171 is maintained for a predetermined short time (200 ms. in the present embodiment) to allow completion of the transition once it has commenced. Many alternatives to this delay feature may alternatively be provided.

The outputs of sensors 52 and 54, are also received at respective terminals 650 and 652 of a NAND gate 141. In the absence of simultaneous receipt of signals from sensors 52 and 54, NAND gate 141 provides an output signal to terminal 634 of AND gate 140. In the simultaneous presence of signals at terminals 632, 634 and 636, AND gate 140 provides a signal henceforth referred to as control signal V.

The provision of control signal V indicates that (a) the transmission ratio of transmission 15 is at the extreme end of its efficient range and rotating parts of the transmission are in synchronization, and (b) the transmission is not arranged for operation in mode II, and (c)

there is a definite desire on the part of the operator to accelerate the vehicle.

Control signal V is supplied to terminal 656 of clutch controller 146. Receipt of signal V at terminal 656 results in the elimination of the signals at respective terminals 530 and 528 of clutches 12 and 21 thereby causing decoupling of clutches 12 and 21, and disconnecting the flywheel 17 and heat engine 10 from respective shaft 23 and drive terminal 14.

Control Signal V is also supplied to respective terminals 658, 660 and 662 of ACTUATOR controls 145, 148 and 147. Receipt of these signals produces EXTEND signals at respective actuator terminals 514, 518 and 572, thereby causing respective actuators 46, 48 and 47 to extend. Synchroniser 42 is thus positioned so as to engage gear 39 to shaft 23 and decoupler gear 37 from shaft 23. Confirmation of this engagement is provided by sensor 52. Synchroniser 44 is thus positioned so as to engage gear 33 to shaft 31 and disengage gear 35 from shaft 31. Verification of this engagement is provided by sensor 54. This coupling arrangement will hereinafter be referred to as coupling for operation in mode II.

Control signal V is also supplied to terminal 768 of HST control 104 causing the output signal applied at terminal 512 to be eliminated, thereby maintaining the transmission ratio of transmission 15 constant while the transition between mode I to mode II is in progress.

As soon as coupling for operation in mode II has been completed, sensors 52 and 54 provide signals at NAND gate 141, thereby terminating the signal at terminal 634 of AND gate 140 and thus eliminating control signal V and indicating that a transition from mode I to mode II has been completed.

Elimination of control signal V at terminal 656 of clutch control 146 engages clutches 21 and 12 thereby recoupling the flywheel 17 to shaft 23 and the heat engine 10 to drive terminal 14. Elimination of the control signal V input at terminal 768 of HST control 104 allows the output at 512 to return to normal operation in mode II.

Figure 4A:
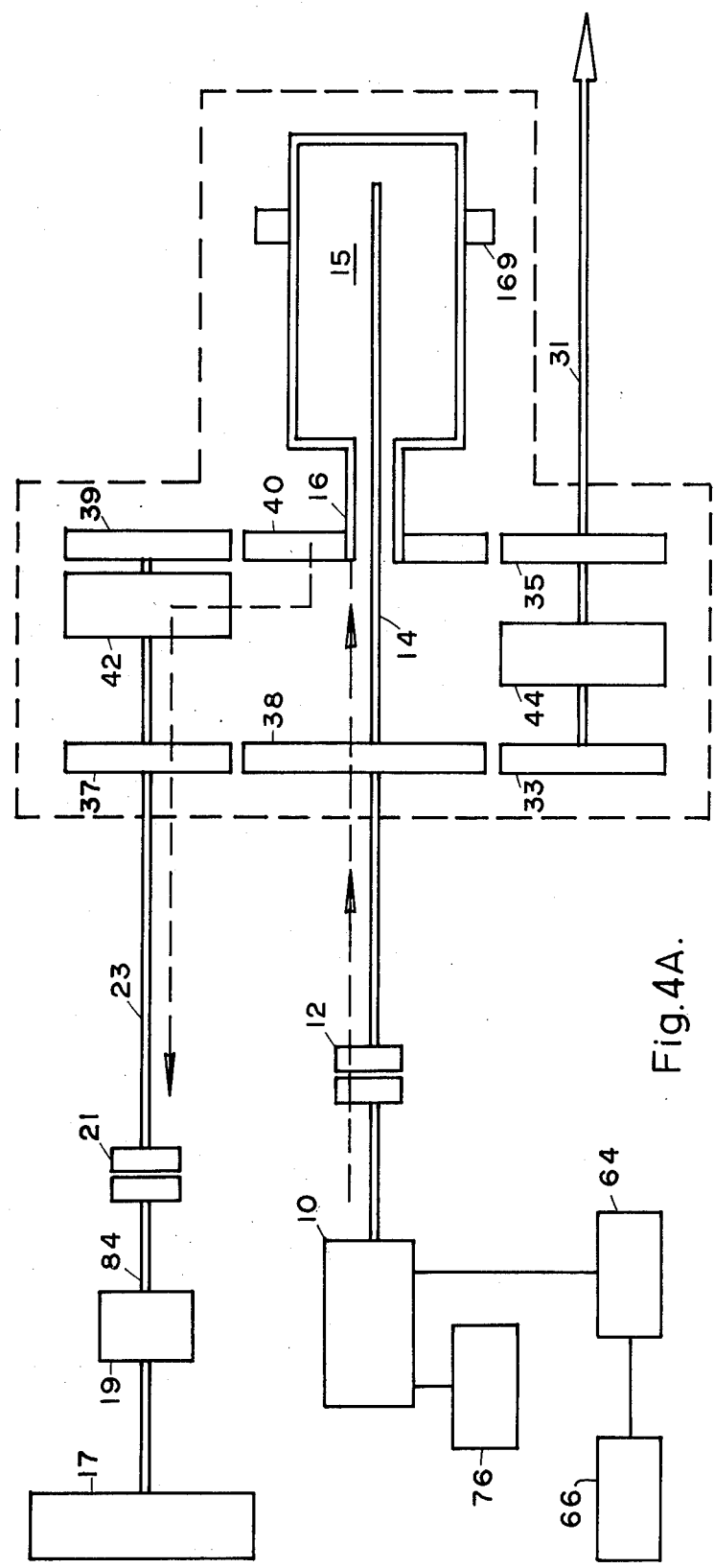
FIG. 4A shows the variable speed transmission of the system of FIG. 1 in a starting mode of operation.

The transmission is now coupled for power flow in mode II. This coupling arrangement is illustrated schematically in FIG. 4C.

The return transition from mode II to mode I is also automatically effected by the control circuitry provided in accordance with an embodiment of the invention.

As noted above, sensor 80 which is activated when the transmission ratio of transmission 15 has reached the end of its efficient range also provides an output to input terminal 635 of AND gate 138. In this case, the system is operating in mode II and the end of the efficient range is reached as the vehicle decelerates.

The analog output of comparator 114 is also provided at input terminal 644 of threshold circuit 149. If the analog signal is negative and its magnitude at 644 is greater than a predetermined value, indicating a definite desire on the part of the operator to decelerate the vehicle, threshold circuit 149 provides an output to terminal 638 of AND gate 138. The output of the threshold circuit 149 will continue to be provided for a predetermined small length of time (200 ms in the preferred embodiment) even if the magnitude of the negative input signal falls below the threshold value, in order to allow completion of the transition once it has commenced. Many obvious alterations to this delay feature are readily apparent.

The output of sensors 50 and 56 are also supplied to respective terminals 646 and 648 of a NAND gate 143.

In the absence of simultaneous receipt of signals from sensors 50 and 56 NAND gate 143 provides an output to terminal 640 of AND gate 138.

The simultaneous presence of ON signals at terminals 635, 638 and 640 of AND gate 138 will result in the provision of control signal VI at the output of AND gate 138.

Control signal VI is supplied to input terminal 664 of clutch controller 146. Receipt of this signal at terminal 664 eliminates the signal at terminals 528 and 530 of clutches 21 and 12 respectively, thereby decoupling the clutches 21 and 12 and disconnecting the flywheel 17 and heat engine 10 from respective shafts 23 and 14.

Control signal VI is also provided to terminal 770 of HST control 104. Receipt of an ON signal at 770 terminates the output signal at terminal 512, thereby maintaining the transmission ratio of transmission 15 constant during transitions from mode II to mode I.

Control signal VI is also supplied to respective terminals 712, 716 and 714 of actuator controls 145, 147 and 148. Receipt of signals at respective terminals 712, 716 and 714 produces RETRACT signals at respective terminals 596, 516 and 574 of actuators 46, 47 and 48 respectively. Synchroniser 42 is positioned so as to couple gear 37 to shaft 23 and disengage gear 39 from shaft 23. Confirmation of this engagement is provided by sensor 50. Synchroniser 44 is positioned so as to engage gear 35 to shaft 31 and disengage gear 33 from shaft 31. Confirmation of this engagement is confirmed by sensor 56.

The transmission has now been returned to the engagement hereinabove referred to as coupling for operation in mode I. Once sensors 50 and 56 are activated, by the engagement of gears 37 and 35 respectively, to respective shafts 23 and 31 they provide simultaneous signals at terminals 646 and 648 of NAND gate 143 thus eliminating the signal at the output thereof with the result that control signal VI is terminated.

The elimination of control signal VI restores the signals at terminals 528 and 530 of clutches 21 and 12 respectively, thereby engaging clutches 21 and 12, and recoupling flywheel 17 and heat engine 10 to their respective shafts 23 and 14.

Figure 4B:
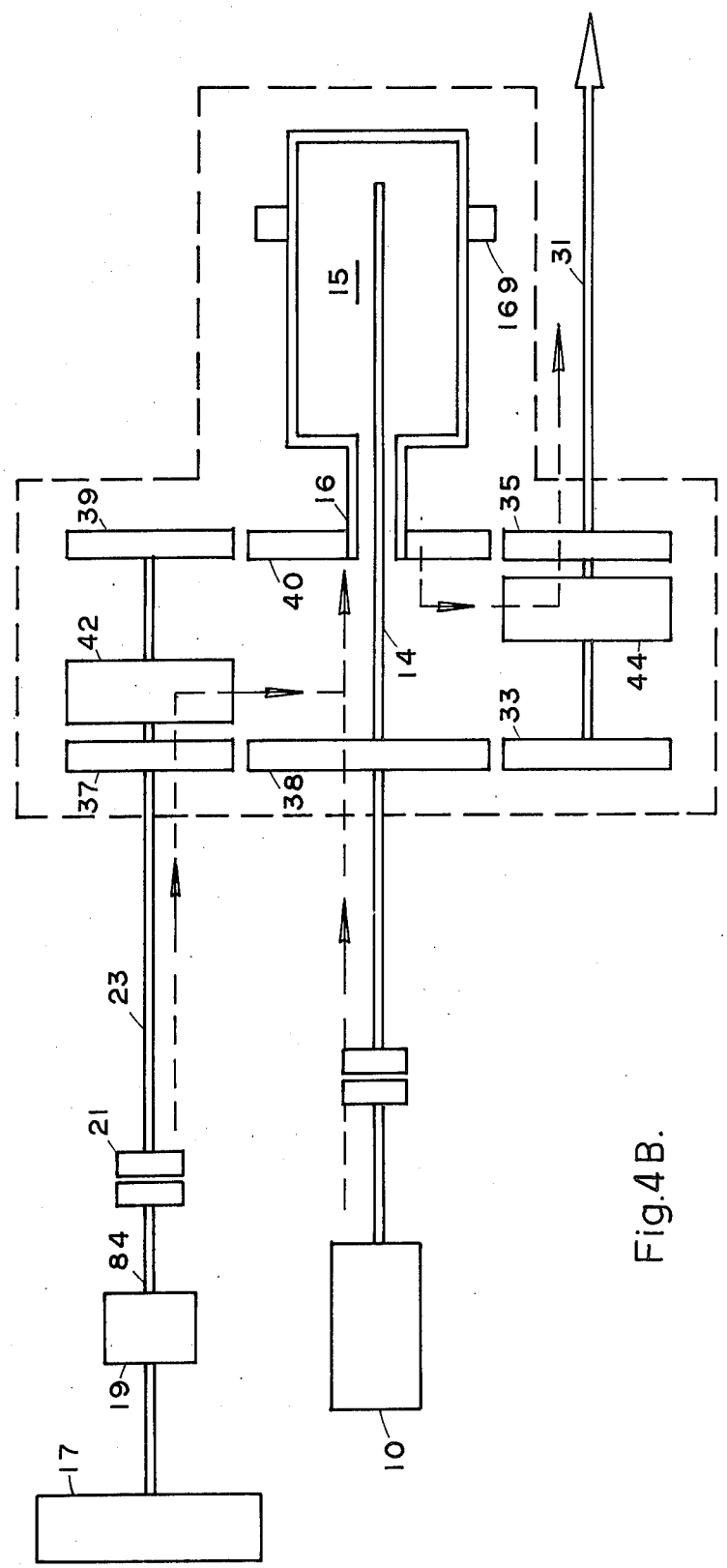
FIG. 4B shows the variable speed transmission of the system of FIG. 1 in a first mode of operation.
Figure 4C:
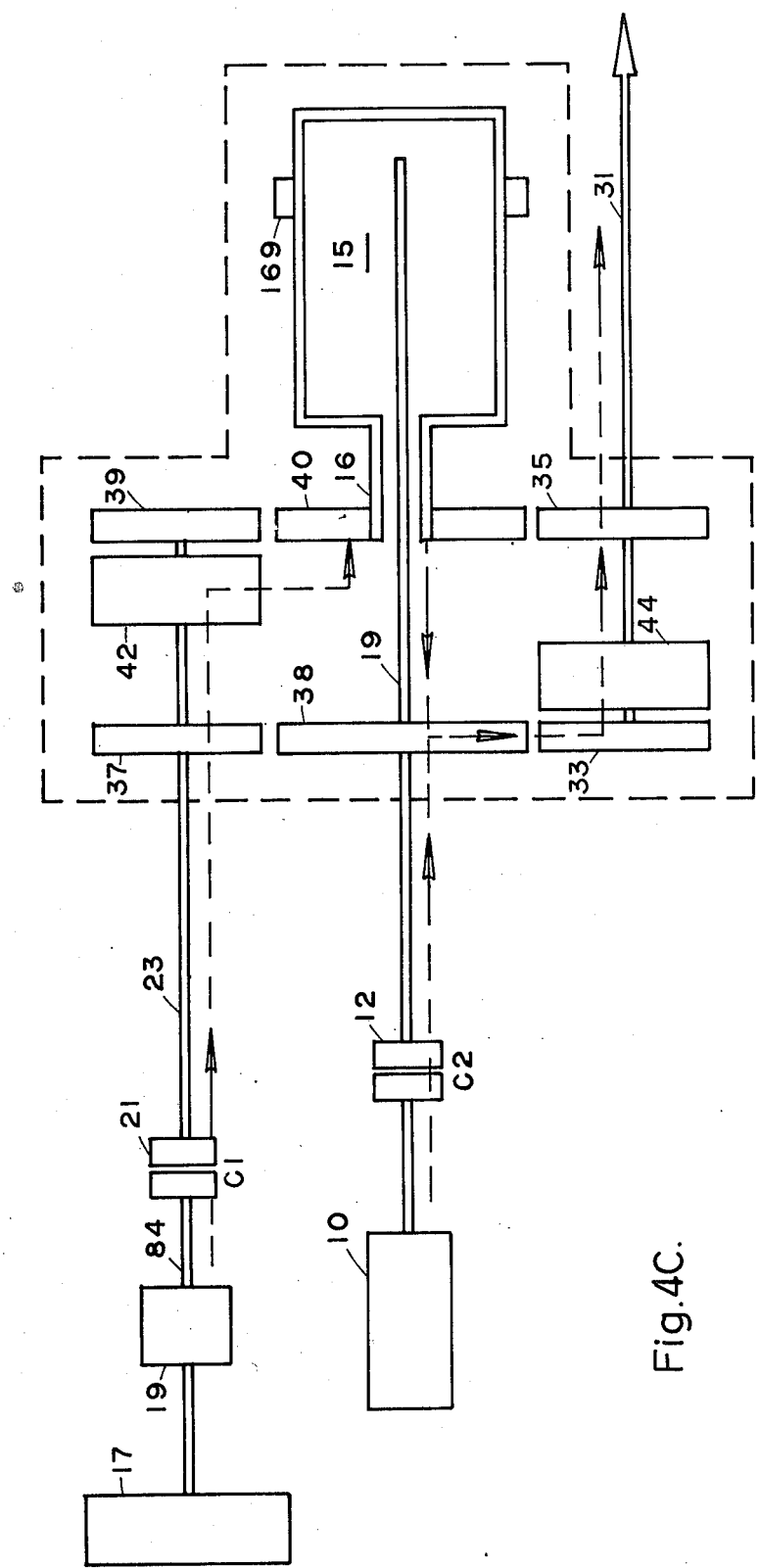
FIG. 4C shows the variable speed transmission of the system of FIG. 1 in a second mode of operation.

The transmission is now disposed for power flow in mode I and is illustrated schematically in FIG. 4B.

As the vehicle accelerates during operation in operational mode II, the transmission ratio of transmission 15 is decreased. If the transmission ratio is less than 1:1, the lower the transmission ratio, the lower is the efficiency of the transmission. At a predetermined ratio (1:0.34 in the present implementation) the efficiency of the transmission reaches a value below which its efficiency drops very rapidly.

At this predetermined ratio the control sleeve 169 of transmission 15 activates sensor 78, which produces a signal as long as the transmission ratio is equal to or less than the hereinabove described ratio.

Sensor 78, which is a standard microswitch in the preferred embodiment, has sufficient hysteresis so that the switch remains activated until the transmission ratio increases to a value (1:0.36 in the preferred embodiment) higher than the hereinabove described ratio.

The output of sensor 78 is provided to terminal 670 of an AND gate 152. The outputs of sensors 52 and 54 are provided at respective terminals 674 and 676 of an AND gate 160. A signal at the output of AND gate 160 provided to input 672 of AND gate 152 in response to simultaneous receipt of signals at inputs 674 and 676, indicates that the gears are coupled for operation in mode II.

In the simultaneous presence of inputs at terminals 670 and 672 AND gate 152 provides an output, hereinafter referred to as control signal VII which indicates that (a) the transmission 15 has reached the extreme of its efficient ratio in mode II and (b) the transmission is in fact in mode II.

Figure 4D:
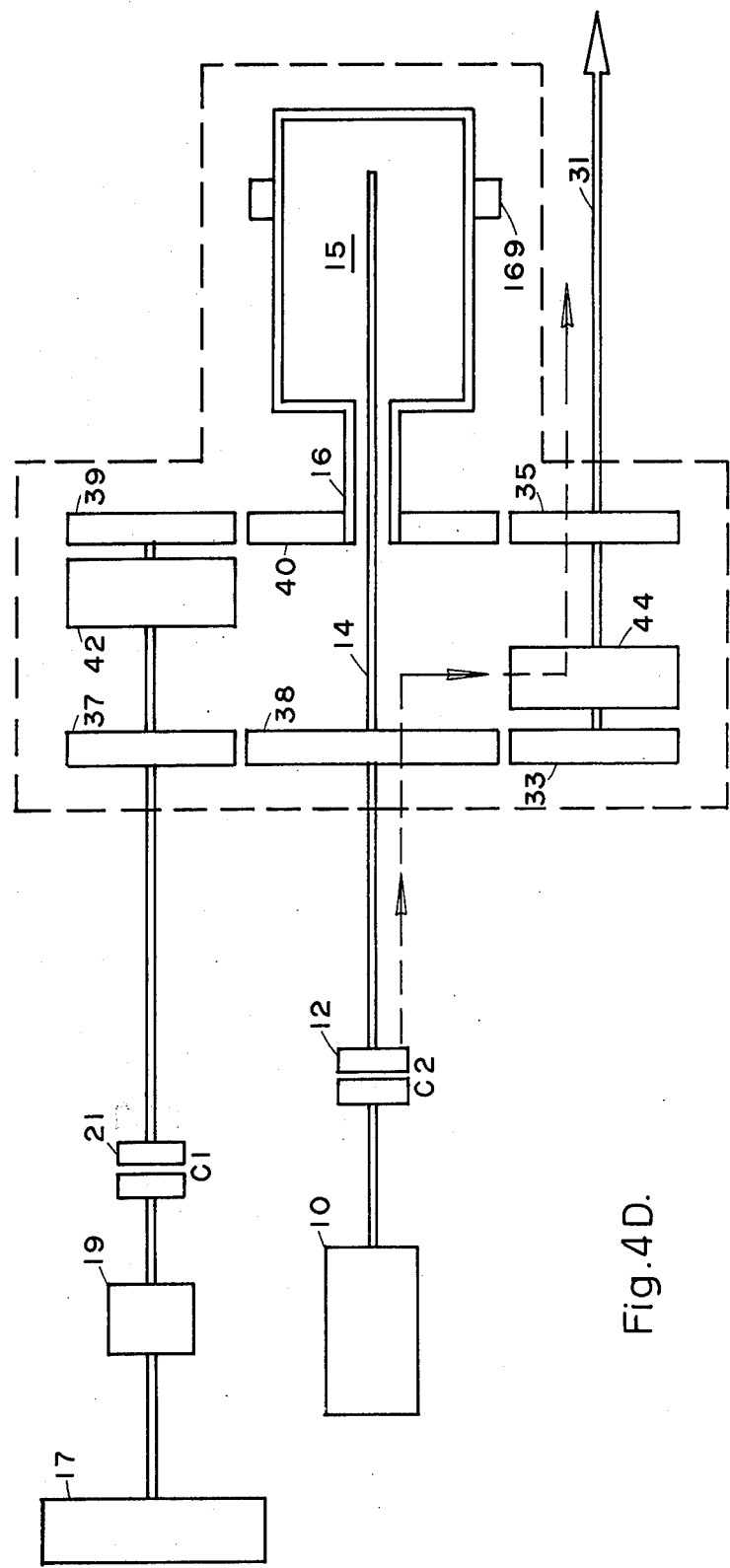
FIG. 4D shows the variable speed transmission of the system of FIG. 1 in a highway mode of operation.

The provision of Control Signal VII indicates that the system is arranged for operation in the Highway Mode. The power flow of the system in the highway mode is illustrated in FIG. 4D.

According to an alternative embodiment of the invention, a transition to the highway mode may be accompanied by disengagement of clutch 21 to eliminate the effect of flywheel frictional losses.

Control signal VII is supplied to a trigger input 696 of a sample and hold circuit 156. The analog output of sensor 60, indicating the rotational speed of flywheel 17, is also supplied to a terminal 694 of sample and hold circuit 156. Receipt of a control signal VII at terminal 696 causes circuit 156 to sample the value of the analog signal appearing at terminal 694 at the time that control signal VII is initially received. This sampled value is provided at the output of circuit 156 and is retained until control signal VII is eliminated. The output of circuit 156 is reset each time control signal VII appears at terminal 696.

The analog value of the signal at the output of circuit 156 therefore represents the speed of flywheel 17 at the time the system commences operation in the Highway Mode.

Control Signal VII is also supplied to terminal 682 of injector control 102. Receipt of control signal VII at terminal 682 causes the analog value of the signal from actuator pedal 70 at terminal 680 to appear at output terminal 554 of injector control 102.

In the highway mode therefore, the value of $r_c$, and hence the amount of fuel injected to heat engine 10 per engine revolution, is controlled directly by accelerator pedal 70.

Control signal VII is also supplied to terminal 702 of HST control circuit 104. The analog output of sample and hold circuit 156 is supplied to the positive terminal 700 of a comparator 158. The analog output of sensor 60, representing the rotational speed of the flywheel, is provided at the negative terminal 698 of comparator 158. The analog value of the output of comparator 158 therefore represents the difference between the flywheel speed at the time operation in the highway mode was commenced and the current speed of the flywheel.

The output of comparator 158 is supplied to terminal 684 of HST control circuit 104. Receipt of Control Signal VII at terminal 702 causes the analog value appearing at terminal 684 to be supplied to output terminal 512 of HST control circuit 104. It is appreciated that at the instant of sampling by circuit 156, the value of the output of comparator 158 is zero.

The presence of a positive signal at input 684 indicates that the speed of flywheel 17 has decreased since operation in the highway mode was commenced, and thus the transmission ratio of transmission 15 should be increased to restore the desired flywheel speed. Similarly an increase in flywheel speed results in a decrease of the transmission ratio of transmission 15.

In the present embodiment, sensor 78 is activated at a transmission ratio of 1:0.34, which corresponds to a vehicle speed 70 km/hr. The maximum speed of the vehicle, limited by the output power of heat engine 10 and by the maximum allowable speed of drive terminal 14, is 90 km/hr in the present embodiment. Consequently, the minimum transmission ratio in the highway mode will be approximately 1:0.26.

When the vehicle decelerates, the transmission ratio of transmission 15 increases. When a transmission ratio of approximately 1:0.36 is reached, corresponding to a vehicle velocity of approximately 66 km/hr, the output signal from sensor 78 will terminate, thus eliminating Control Signal VII.

The absence of Control Signal VII indicates that the system is no longer in the highway mode and has returned to operation in mode II and eliminates the inputs at terminal 682 of injector control 102 and at terminal 702 of HST control 104.

The elimination of signals at terminals 682 and 702 causes injector control 102 and HST control 104 to return to their normal mode of operation in mode II.

It is appreciated that the transmission ratios and vehicle speeds described hereinabove are for illustrative purposes only. Suitable gear ratios may be readily chosen to provide virtually any desired vehicle performance characteristics.

Operation of the vehicle drive control and transmission system set forth in the preceding detailed description will now be summarized in conjunction with FIGS. 4A-E, 5A-B and 6. Operation in the LOW mode and Reverse will be dealt with separately hereinafter.

Operation of the vehicle is initiated by an operator positioning the contact of engine starting switch 74 to produce a momentary start signal and a continuing ON signal, while at the same time positioning function selector lever 73 in neutral. The start signal simultaneously energizes engine starter 76 which may be a conventional automotive starter and enables the provision of a control signal to input 504 of injector control 102. This signal results in the provision of a signal at output terminal 506 to terminal 508 of solenoid 61 of injector actuator 69 thereby positioning control rod 167 of fuel injector 64 so that a sufficiently rich mixture is provided to start heat engine 10.

The ON signal received at input 511 of hydrostatic transmission control circuitry 104 results in the provision of an analog signal at output terminal 512 of HST control circuitry 104 to transmission ratio selector 67, which causes selector 67 to position sliding sleeve 169 so as to establish a 1:0 transmission ratio at transmission 15. Proper setting of the transmission ratio at 1:0 is verified by sensor 82. Starting of the engine is verified aurally by the operator. Alternatively, engine ignition may be verified by a suitable sensor.

Simultaneously with starting of the engine the START signal from switch 74 causes actuators 46 and 48 to extend and actuator 47 to retract thereby to couple gear 39 to shaft 23, decouple gear 37 from shaft 23 and to decouple both gears 33 and 35 from shaft 31 thus providing coupling for Starting Mode operation. Verification of this coupling arrangement is provided by the operation of sensors 52 and 58. Following this verification, Control Signal I is provided to clutch controller 146 causing engagement of clutches 12 and 21 which are disengaged at ignition. A power train is thus established from heat engine 10 via clutch 12, drive terminal 14, drive terminal 16, gears 40 and 39, shaft 23, clutch 21 to flywheel 17 as illustrated in FIG. 4A.

Also in response to Control Signal I injector control 102 provides a control signal to solenoid 63 of actuator 69 which is operative to increase the fuel supply to engine 10 to cause it to operate approximately at a point where it can produce a substantial portion of its maximum power. Coordinated with the engine speed up and also in response to Control Signal I, the hydrostatic transmission control circuitry provides control signals to ratio selector 67 slowly to increase the gear ratio from 1:0. The rate of increase in gear ratio is selected to correspond to the available torque of the heat engine and this increase in gear ratio follows the engagement of clutches 12 and 21.

As the transmission ratio is increased from 1:0 the flywheel is energized until it reaches a predetermined maximum speed SFW max which is determined by level indicator 161. Attainment of SFW max is indicated by the provision of Control Signal II. Control Signal II may also be provided prior to flywheel 17 reaching SFW max in either of the following two cases: (a) operation in LOW is desired, (b) the flywheel has reached at least minimum required velocity SFW min and selector lever 73 is in Drive. In response to Control Signal II and so long as selector 68 is neither in Drive or Reverse, injector control circuitry 102 instructs the fuel injector to lower the supply of fuel to the engine to a predetermined idling level and at the same time HST control circuitry 104 quickly reduces the transmission ratio back to 1:0 at a predetermined selected rate.

In response to verification from sensor 82 of the setting of the transmission ratio at 1:0 and to setting of the function selector lever 73 by the operator to DRIVE or LOW, Control Signal III is provided to actuator controls 145, 147 and 148 with the result that the gears are coupled as follows: Gear 37 is coupled to shaft 23 establishing a power train from shaft 23 via gears 37 and 38 to first drive terminal 14 of transmission 15. Gear 35 is coupled to shaft 31 thereby establishing a power train from the second drive terminal 16 of transmission 15 via gears 40 and 35, and drive shaft 31 to the drive wheels of the vehicle. At this stage the drive control and transmission system is prepared for transition to operation mode I.

Motion of the vehicle is initiated by the operator pressing on the accelerator pedal sufficiently to produce an output representing an indication that vehicle motion is desired. This output is supplied in the form of Control Signal IV to clutch control 146 and results in engagement of clutches 12 and 21 thereby coupling: (a) flywheel 17 via fixed reducer 19, clutch 21, shaft 23 and gears 37 and 38 to first drive terminal 14; (b) heat engine 10 via clutch 12 to first drive terminal 14; and (c) second drive terminal 16 via gears 40 and 35 to output shaft 31 and thence to the drive wheels of the vehicle. This coupling arrangement, illustrated in FIG. 4B, represents operation in mode I.

According to an embodiment of the invention it may be possible for an operator to initiate motion of the vehicle prior to complete energization of the flywheel provided that the flywheel rotation speed is above a predetermined minimum. Vehicle motion may be initiated by the operator positioning function control lever 73 in either DRIVE, REVERSE or LOW and also depressing the accelerator pedal.

To initiate vehicle motion either prior to or following complete flywheel energization, the driver may place the function control lever 73 in the drive position. Pressure of the operator on the accelerator 70 in addition to producing the signal discussed above, also provides an analog signal which is proportional to the demand of the operator for torque to drive the vehicle. This demand for torque is compared in comparator 114 with the cut-off ratio $r_c$ which as noted above determines the amount of fuel injected into the engine per revolution. In the exemplary embodiment of the invention where heat engine 10 comprises a diesel engine, the cut-off ratio $r_c$ is substantially proportional to the torque produced by the heat engine.

In an alternative embodiment of the invention, means are provided for terminating engine operation when the vehicle stands still, thereby eliminating the pollution and fuel consumption which would otherwise occur. As described above, when the vehicle is at rest, clutches 21 and 12 are open, thereby disconnecting the engine 10 and flywheel 17 from the transmission.

In response to a received verification from sensor 82 that the transmission ratio is at 1:0, to a received verification from accelerator pedal 70 that the accelerator pedal is not depressed, to a received verification from sensors 50 and 56 that the transmission is arranged for operation in the first mode of operation, and to a received verification from level indicator 161 that the flywheel is above a speed corresponding to SFW min, AND gate 433 provides an output signal which results in the application by injector control circuitry 102 of a negative voltage, typically −24V to injector actuator 69, thereby shutting off the fuel supply to engine 10 and causing the engine to stop rotating. a control signal to transmission ratio selector 67 to change the transmission ratio of hydrostatic transmission 15 in a sense which increases the output speed of the second drive terminal 16 which results in an increase in the speed of the vehicle. This increased speed requires an increase in the output torque of the hydrostatic transmission unless the road is downhill. The reaction to the increased torque of the second drive terminal of the hydrostatic transmission serves to increase the torque of the first drive terminal 14.

Drive terminal 14 receives torque from two sources, from flywheel 17 via shaft 23 and gears 37 and 38, and from heat engine 10. The torque output of the flywheel, which acts to decelerate the flywheel, causes the kinetic energy of the flywheel to decrease. If the loss of kinetic energy of the flywheel exactly equals the gain of kinetic energy of the vehicle, then the total amount of kinetic energy in the system, as measured by the output signal from summing circuitry 120 will remain constant. If the total amount of kinetic energy represented by the output signal of summing circuitry 120 equals the reference kinetic energy then the output of comparator 128 will also be zero indicating that the injector control should not change the cut-off ratio governing the supply of fuel to the engine.

If the flywheel 17 does not drop in speed sufficiently so that the loss of kinetic energy of the flywheel is equal to the gain of kinetic energy of the vehicle then the output of summing circuitry 120 will be greater than the reference kinetic energy producing a negative output signal from comparator 128. This negative output signal causes injector control 102 to lower the $r_c$ output, thereby commanding the fuel injector 64 to decrease the amount of fuel injected to the engine per cycle. Consequently the engine will supply less torque to shaft 14. Hence the torque provided by the flywheel 17 will increase, further decreasing the speed of the flywheel, such that it provides a greater share of the torque to drive the vehicle.

In other terms, if the flywheel does not lose exactly the amount of kinetic energy gained by the vehicle, the net increase in the total kinetic energy of the system will be immediately sensed and the cut-off ratio $r_c$ will be adjusted by fuel injector 64. If on the one hand flywheel 17 provides too much kinetic energy, the cut-off ratio is increased. If, on the other hand, the flywheel does not provide sufficient kinetic energy, the cut-off ratio to the heat engine is decreased, thereby imposing a greater torque demand on the flywheel.

The cut-off ratio $r_c$ therefore is continuously being adjusted such that the flywheel accounts for kinetic energy changes in the vehicle and the engine accounts for all other energy requirements such as friction losses.

The above relationship may be expressed in other words, as follows: The flywheel provides the torque required to accelerate the vehicle, while the torque required to overcome operating losses is provided by the engine. Since the cut-off ratio $r_c$ determines the torque produced by the engine, the value of $r_c$ is therefore proportional to the torque required to overcome all energy losses in the system.

If the torque demand is exactly equal to the torque required to overcome all losses, the engine is producing exactly the right amount of torque to satisfy the demand indicated by the operator. If the operator desires to travel faster, he will request more torque than that required to As soon as accelerator pedal 70 is actuated, indicating a desire on the part of the operator to initiate vehicle motion, clutches 21 and 12 are closed by clutch control 146 and injector control citcuitry 102 provides an appropriate signal to injector actuator 69 to provide fuel to engine 10. It is thus appreciated that the heat engine is turned off when the vehicle is at rest and is restarted by the energy of the flywheel as soon as vehicle motion is to commence.

If the vehicle is travelling at a constant speed, and the speed of flywheel 17 is also constant, the analog signal representative of the torque demand equals $r_c$ within a scaling factor such that the output signal from comparator 114 is substantially zero and the transmission ratio remains constant. In such a case the engine is providing exactly the right amount of torque to overcome all of the energy losses in the system. If the operator then increases pressure on the accelerator pedal the aplitude of the analog output signal therefrom increases, representing an increased torque demand which produces a positive output from comparator 114. A positive signal at the output of comparator 114 causes accelerator amplifier 136 to multiply the value of the signal from comparator 114 by the value $R_3/R_1$. The hydrostatic transmission control circuitry 104 which receives the accelerator amplifier output provides it as overcome all losses. If the operator desires to travel more slowly he will request less torque than is required to overcome all losses.

The value of the difference between the desired torque and the torque required to overcome losses (which is proportional to $r_c$) represents the signal received by the hydrostatic transmission control 104 from comparator 114 via accelerator amplifier 136. Receipt of the signal results in the provision of a control signal to selector 67 which commands the selector to change the transmission ratio either in the direction of increased rotational speed of drive terminal 16 and thus increased vehicle speed and kinetic energy of the vehicle and decreased kinetic energy of the flywheel), or in the direction of decreased rotational speed of terminal 16 and decreased vehicle speed (and kinetic energy of the vehicle and increased kinetic energy of the flywheel).

Therefore the speed of the vehicle is under the complete control of the operator within design limits and the engine is made to produce only the torque required to overcome losses.

Consequently the energy provided by the engine is cut to an absolute minimum over an extended driving cycle and fuel consumption is thereby minimised.

In the event that the operator completely releases or suddenly lets up on the accelerator pedal 70 resulting in a negative output from comparator 114, accelerator amplifier 136 is operative to multiply the output of comparator 114 by a gain, $R_2/R_1$, less than $R_3/R_1$ before supplying the signal to input terminal 510 to control circuitry 104 thereby providing a relatively small negative signal at output 512 which results in a relatively slow change in the transmission ratio and deceleration at a relatively slow rate. Thus, even if the operator releases the accelerator pedal 70 completely, the vehicle will tend to slow down in a manner analogous to coasting in an ordinary conventional automobile. If the operator wishes to slow down more rapidly he may press down on brake 72, providing an analog signal at input 630 of transmission control circuitry 104, which changes the transmission ratio rapidly in the direction of deceleration, thereby slowing down the vehicle and speeding up the flywheel.

If the vehicle still does not slow down sufficiently further pressure on the brake pedal 72 produces a hydraulic output which actuates the conventional braking system of the vehicle.

During operation of the vehicle in mode I, increased pressure on the accelerator pedal 70 results in the operation of transmission ratio selector 67 causing slidable sleeve 169 to move in the direction of sensor 80 thereby increasing the transmission ratio and thus the vehicle speed. When hydrostatic transmission 15 reaches the end of its efficient range, sensor 80 provides an output signal to initiate a transition from Mode I to Mode II. If the operator indicates, by the amount of pressure on the accelerator his intention to accelerate the vehicle, a Control Signal V is provided to clutch controller 146 thereby disengaging clutches 21 and 12.

Gears 39 and 40 are constantly in mesh so that the angular velocity of gear 39 is determined by the rotational velocity of the second drive terminal 16 of variable transmission 15 and by the diameter ratio between gear 40 and gear 39. This diameter ratio is chosen such that when the transmission ratio of transmission 15 is at the extreme efficient ratio sensed by sensor 80, the speed of gear 39 is substantially equal to the speed of shaft 23. Similarly the diameter ratio of gear 33 and 38 is chosen such that at same extreme ratio, gear 33 and shaft 31 rotate at substantially the same velocity.

In summary, when variable transmission 15 is at its extreme efficient ratio which marks the point of "gear change" shaft 23 and gears 37 and 39 are all rotating at substantially the same angular velocity and shaft 31 and gears 33 and 35 all rotate at the same angular velocity. Because the speeds of the various rotating elements are not precisely identical due to slipping in the variable transmission, clutches 12 and 21 are opened to remove the inertia of the heat engine 10 and flywheel 17 from respective shafts 14 and 23.

A typical set of gear parameters which will enable synchronous gear changing as described above is given in the following table:

$D_{37}$ = 26 teeth
$D_{38}$ = 30 teeth
$D_{39}$ = 30 teeth
$D_{40}$ = 26 teeth
$D_{33}$ = 26 teeth
$D_{35}$ = 30 teeth The fact that the rotational velocities of the various elements to be coupled are substantially identical enables substantially synchronous gear changes to be made at relatively rapid speeds thus providing relatively uninterrupted power flow as well as an extremely smooth transition.

Signal V also causes actuators 46, 47 and 48 to extend and thus to decouple gears 37 and 35 from respective shafts 23 and 31 and to couple gears 39 and 33 to respective shaft 23 and 31. The resulting gear coupling arrangement illustrated schematically in FIG. 4C enables vehicle operation in Mode II.

The return transition from mode II to mode I is essentially analogous to the transition from mode I to mode II except that the reverse gear change occurs in response to a control signal VI produced in response to a predetermined negative output from comparator 114.

Operation of the vehicle in mode II is substantially analogous to operation in mode I except that in mode I control sleeve 169 is moved from sensor 82 towards sensor 80 for acceleration and from sensor 80 towards sensor 82 for deceleration, and in mode II the directions are reversed.

As the vehicle accelerates control sleeve 169 is moved towards sensor 78 which indicates that the transmission ratio of variable transmission 15 is at its extreme limit for efficient operation in mode II.

If the operator, by pressing on the accelerator, indicates the desire to continue to accelerate the vehicle once the extreme operative limit of the transmission ratio of variable transmission 15 is reached, the vehicle undergoes a transition to the highway mode. This transition is described in detail hereinabove at pages 57-60.

The difference in operation between the mode II and the highway mode, resides in the control of the hydrostatic control circuitry 104. In the mode II the hydrostatic control circuitry 104 receives at input 510 control signals to vary the output at terminal 512 as a function of the difference between the desired torque indicated by the position of accelerator pedal 70 which produces a signal received at terminal 616 of comparator 114 and the engine torque indicated by the value of $r_c$, which is substantially proportional to engine torque and represented by a signal provided at terminal 556 of comparator 114.

In the highway mode the hydrostatic transmission control circuitry 104 is governed by the output of comparator 158 which acts to maintain the flywheel speed substantially constant. It is appreciated that the transitions between the mode II and the highway mode are entirely synchronous as described hereinabove at pages 57-60.

In the highway mode the vehicle behaves substantially as an ordinary conventional heat engine powered vehicle. The desired torque indicated by the output of comparator 260 causes injector control 102 to increase or decrease the cutoff ratio $r_c$ to fuel injector 64 thereby to decrease or increase the fuel injected to heat engine 10. The flywheel is maintained at a constant speed and thus does not participate in driving the vehicle. It is appreciated that the highway mode corresponds to conventional highway driving where the requirement for continuous acceleration and deceleration is not usually present.

For climbing hills, the vehicle may be operated in a LOW gear mode of operation, hereinafter referred to as the LOW mode of operation. The LOW mode of operation may also be used if the operator does not wish to wait for the flywheel 17 to be energized, but desires to drive the vehicle immediately upon starting the heat engine 10.

A transition to the LOW mode is automatically effected by the control circuit provided in accordance with an embodiment of the invention, and is initiated by the LOW signal output from selector lever 68.

The operation of the control circuitry in response to receipt of a LOW signal depends on the mode of operation from which a transition to LOW is desired.

The following description of vehicle operation in the LOW mode is presented by way of example only. Many alternative approaches may be readily provided according to alternative embodiments of the invention.

If the current operational mode of the vehicle is STARTING MODE, the operator may enter LOW mode by selecting LOW on selector 68 and by releasing the accelerator pedal 70.

As described hereinabove, the LOW signal from selector 68 is received at a terminal 608 of OR gate 115 thus providing Control Signal II at the output thereof.

As described hereinabove, Control Signal II is provided at terminal 592 of clutch control 146 and is operative to disengage clutches 21 and 12. Control Signal II is also provided at terminal 564 of injector control 102 which, in response thereto, provides fuel sufficient for idling for heat engine 10, and to terminal 560 of HST control 104 for returning the transmission ratio of transmission 15 to 1:0.

As described hereinabove, the LOW signal from selector 68 is also received at terminal 543 of OR gate 122 and is operational (if sensor 82 provides a signal at terminal 562 of AND gate 112) to provide a signal at the output of AND gate 112, referred to hereinabove as Control Signal III.

As described hereinabove, Control Signal IV, which indicates the desire of an operator to move the vehicle, is provided at terminal 614 of clutch control 146. The LOW signal from selector 68 is provided at terminal 724 of clutch control 146 and is operative to disengage clutch 21 thereby decoupling flywheel 17 and shaft 23.

The system is now disposed for operation in the LOW mode.

Figure 4E:
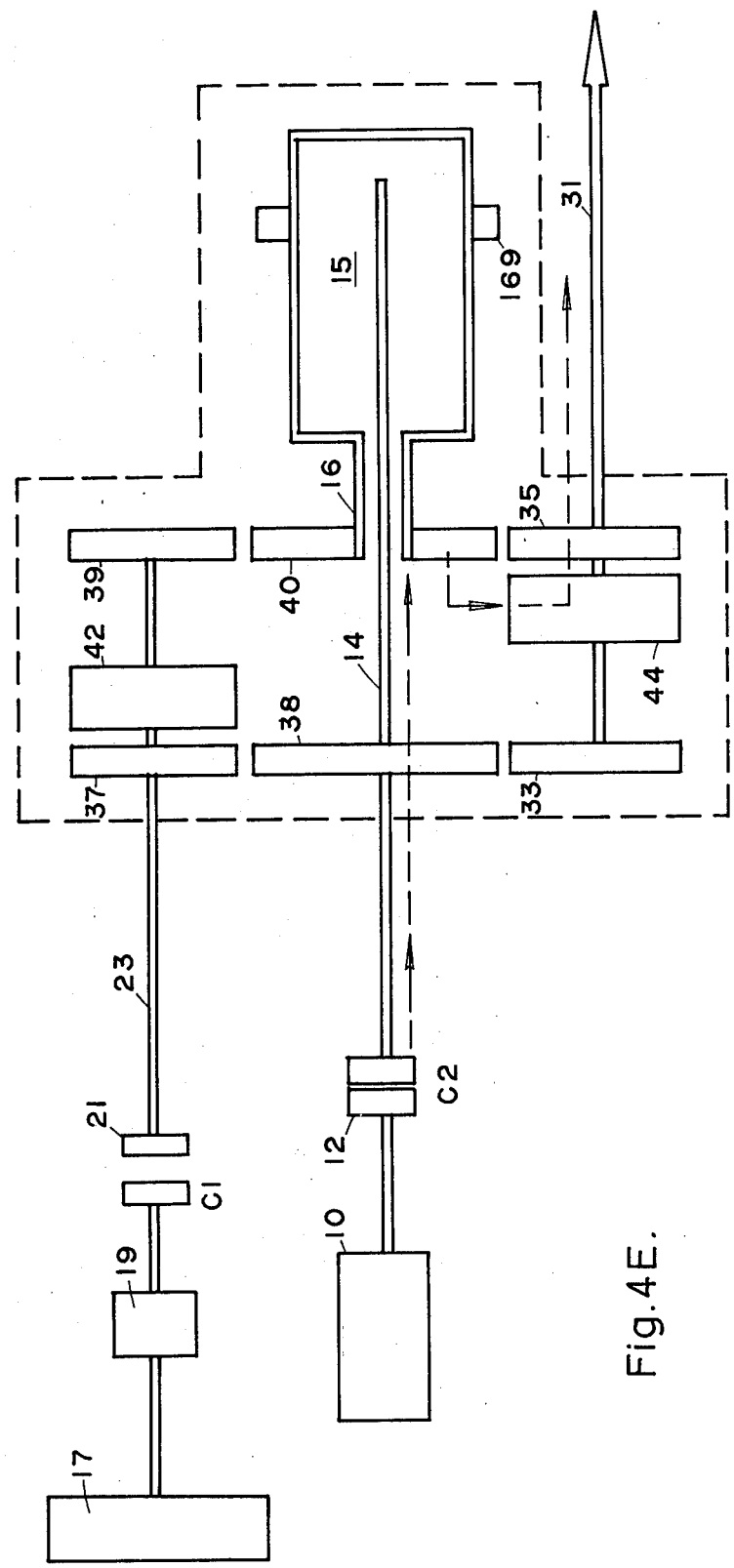
FIG. 4E shows the variable speed transmission of the system of FIG. 1 in a LOW mode of operation.

The power train for operation in the LOW mode is illustrated in FIG. 4E and comprises heat engine 10 driving via clutch 12, the first drive terminal 14 of transmission 15; second drive terminal 16 driving via gears 40 and 35, second shaft 31.

It is noted that the flywheel 17 plays no part in operation in the LOW mode. Indeed, the power train for LOW mode operation is identical in principle with the power train of an otherwise conventional vehicle having a continuously variable transmission.

As noted earlier LOW signal from selector 68 is provided to terminal 722 of injector control 102. The analog output of accelerator pedal 70, as mentioned hereinabove, is also provided to terminal 680 of injector control 102.

Receipt of the LOW signal at 722 causes a signal whose value represents the difference between the analog value of the signal received at terminal 680 from the accelerator pedal 70 and the value of the current injector setting received from output 578 at terminal 681 of injector control 102 to be supplied at output terminal 554 of injector control 102. If the value of the signal received at terminal 680 is larger than the value of the signal received at terminal 681, the analog value of the signal at 554 will be positive causing linear actuator 71 to translate in a direction which causes more fuel to be injected to heat engine 10 per engine revolution. If the value of the signal at terminal 680 is less than the value of the signal at terminal 681, the signal at 554 will be negative, causing linear actuator 71 to translate in a direction which causes less fuel to be injected to heat engine 10 per engine revolution.

The LOW signal from selector 68 is also provided to terminal 720 of HST control 104.

Sensor 176 provides an analog output proportional to the rotational speed of shaft 23. In the LOW mode, the speed of shaft 23 is directly proportional to the speed of heat engine 10. The output of sensor 176 is provided at terminal 565 of HST control 104.

Upon receipt of the LOW signal at terminal 720, HST control 104 is operative to provide an analog signal at output terminal 512 proportional to the difference between the analog signal received at terminal 565, which is proportional to actual engine speed, and the predetermined speed S engine (3200 rpm in the present embodiment) which is proportional to the speed at which heat engine 10 can produce a substantial portion of its maximum power. If the analog signal at terminal 565 is larger than Sengine, the analog signal supplied at terminal 512 will be positive, causing ratio selector 67 to increase the tranmission ratio of transmission 15, thereby reducing the speed of heat engine 10 so that it can produce more power.

If the analog signal at terminal 565 is less than Sengine, the analog signal supplied at terminal 512 will be negative causing ratio selector 67 to decrease the transmission ratio of transmission 15, thereby increasing the speed of heat engine 10 so that it may produce more power.

As noted earlier, the output of sensor 62, indicating the speed of the vehicle, is also provided at terminal 772 of HST control 104. If the value of the analog signal at terminal 772 is less than a value corresponding to a predetermined small value (approx. 10 km/hr in the present embodiment of the invention) HST control 104 is operative to invert the polarity of the difference between the desired engine speed and the actual engine speed received at terminal 565. Consequently, if for example the vehicle is at rest, and hence the transmission ratio is at 1:0 HST control 104 is operative to increase the transmission ratio so that the vehicle can start moving. Once 10 km/hr is reached, the transmission ratio may be controlled as described hereinabove.

In an alternative embodiment of the invention, means are provided to increase the engine speed, thereby increasing the engine braking effect during a long steep decline.

During operation in the LOW mode, a signal is present at terminal 408 of AND gate 406. At terminal 401 of level indicator 400, an analog signal is received from terminal 578 of injector actuator 69 indicating the position of injector actuator 69. If the signal received at terminal 401 is zero, indicating that no fuel is being fed to the engine, level indicator 400 provides a signal to terminal 404 of AND gate 406. The presence of a signal at the output of AND gate 406 indicates that the vehicle is in LOW and that no fuel is being fed into the engine and thus that the vehicle is on a decline. This signal activates relay 414 thus providing predetermined analog signal S engine high to terminal 956 of HST control circuitry 104 and thereby allowing the engine to operate at a higher speed and thereby absorb more energy during a descent. If fuel is being fed into the engine, relay 418 is activated through NAND gate 410, thereby allowing the engine to operate at a speed indicated by the analog signal S engine (about 3200 rpm in the present embodiment) for ascending a hill.

According to a further alternative embodiment of the invention, the amount of fuel injected to heat engine 10 and the transmission ratio of transmission 15 may be controlled in the LOW mode so as to minimize fuel consumption.

If the current operational mode of the vehicle is Mode I, the operator may enter the LOW mode by placing lever 73 at LOW and by releasing accelerator pedal 70.

The LOW signal from selector 68 is provided to terminal 724 of clutch control 146. Receipt of this signal at terminal 724 results in decoupling of clutch 21 and thus decoupling flywheel 17 from shaft 23.

The LOW signal from selector 68, as described hereinabove, is also provided at terminal 722 of injector control 102 and causes injector control 102 to operate exactly as described hereinabove with reference to operation in the LOW mode subsequent to a transition from the starting mode. The LOW signal from selector 68, as described hereinabove, is also provided at terminal 720 of HST control 104 and causes HST control 104 to operate exactly as described hereinabove with reference to operation in the LOW mode subsequent to a transition from the starting mode.

If the current operational mode of the vehicle is mode II the operator may enter mode LOW by selecting operational LOW mode on selector 68 and by releasing the accelerator pedal 70.

The LOW signal from selector 68 is provided to terminal 720 of HST control 104. The output of sensors 52 and 54, indicating that the transmission is arranged for operation in mode II, is provided to terminals 628 and 629 of HST control 104, respectively. The simultaneous presence of ON signals at terminals 628, 629 and 720 of HST control 104 is operative to provide a large positive signal from relay 344 to terminal 512 of HST control 104 thereby causing ratio selector 67 to rapidly increase the transmission ratio of transmission 15 towards the extreme end of the useful range (1:1 34 in the present embodiment). This signal at terminal 512 continues until sensor 80 is activated indicating that the transmission ratio has reached its extreme value (1:1.34 in the preferred embodiment) and is in synchronisation. Because the accelerator pedal is released, all the conditions are present at AND gate 138 to generate control signal VI as described hereinbelow. As described hereinabove, control signal VI is operational to initiate and carry out the transition from mode II to mode I. Consequently, once sensor 80 is activated, the gear coupling arrangement will be changed from the coupling arrangement for operation in mode II to the coupling arrangement for operation in mode I, all as described hereinabove.

The normal transition from mode II to mode I is completed by re-engaging clutches 21 and 12, as described hereinabove. However, the presence of a signal at terminal 724 of clutch control 146, indicating that the system is in the LOW mode, overrides the normal signal which enables re-engagement of clutch 21 upon completion of the gear coupling arrangement for operation in mode I, and prevents clutch 21 from being engaged. Consequently, the hereinabove described power train for operation in LOW mode and illustrated in FIG. 4E has been established.

The operation of HST control 104 is now exactly as is described hereinabove with reference to operation in the LOW mode after a transition from mode I.

The operation of injector control 102 is now exactly as is described hereinabove with reference to operation in the LOW mode after a transition from the starting mode.

If the current operational mode of the vehicle is the hill-climbing mode, the operator may enter the LOW mode by selecting LOW on selector 68 and by releasing the accelerator pedal 70. The resulting transition to the LOW mode is identical with the transition from mode II to the LOW mode as described hereinabove.

Transitions from the LOW mode to the normal modes of operation I, II or hill-climbing is automatically effected by the control circuit described in accordance with an embodiment of the invention. It is noted that during operation in the LOW mode, the flywheel 17 is decoupled from shaft 23. Since operation in the low mode may continue indefinitely, when the operator selects DRIVE on selector 68, the flywheel, in an extreme case, may be at zero rotational velocity.

In accordance with a perferred embodiment of the invention, selection of the proper mode of operation when transition out of operation in LOW is requested, is automatically effected by the control circuit.

The analog output of sensor 60, indicating flywheel rotational speed, is supplied to terminal 740 of selector 68. The analog output of sensor 62, indicating the velocity of the vehicle, is also provided to terminal 742 of selector 68. If the current operational mode of the vehicle is LOW and the analog value of the signal at terminal 740 is less than a predetermined value corresponding to a predetermined minimum speed of the flywheel 17, (4500 rpm in the present embodiment), selector 68 is operative so that positioning of lever 73 at DRIVE does not change the output signal of selector 68. The LOW signal is maintained at the LOW output and no signal appears at the DRIVE output terminal of selector 68 even though the selector lever 73 may be in DRIVE.

Consequently, the vehicle will remain in the LOW mode. Before returning to normal operation, the vehicle must be brought to rest so that the flywheel 17 may be recharged.

In an alternative embodiment of the invention transfer out of the LOW mode during motion of the vehicle may be achieved by adding additional control features of the system.

In yet another alternative embodiment, clutch 21 may be of sufficient heat dissipating capacity to allow energization of flywheel 17 without bringing the vehicle to rest.

If the current operational mode of the vehicle is LOW and the analog value of the signal at terminal 740 is greater than or equal to a value corresponding to the hereinabove described SFW min (5800 rpm in the present embodiment) and the analog value of the signal at terminal 742 of selector 68 is less than a value corresponding to the vehicle speed at which a transition between mode I and mode II normally takes place (approx. 25 km/hr in the present embodiment), selector 68 is operative so that operator operational command DRIVE will be provided at the DRIVE output terminal of selector 68 and LOW signal will be provided at the LOW output terminal of selector 68. Selector 68 is also operative to maintain a signal at output terminal 777, which is in turn provided to terminal 776 of HST control 104.

The simultaneous presence of signals at terminals DRIVE, LOW and 777 of selector 68 indicates that the operational mode of the vehicle is LOW, and the operator has requested transition out of LOW, yet the transition has not yet been completed.

Injector Control 102 is operative upon receipt of a signal at input terminal 746 simultaneously with a signal at terminal 722 to produce a predetermined large negative signal at output terminal 554, thereby to cause linear actuator 71 to cause fuel injector 64 to provide no fuel to heat engine 10.

Sensor 60 also provides an analog output signal to terminal 750 of HST control 104. HST control 104 is operative, upon receipt of a signal at terminal 776 to produce an analog output at terminal 512 which is proportional to the difference between the analog value at terminal 750 of HST control 104 (which is proportional to the speed of shaft 84) and the analog value at terminal 565 which is proportional to the rotational speed at shaft 23.

The hereinabove described signal at terminal 512 is operative to rapidly change the transmission ratio of transmission 15 in a direction which reduces the difference between the value of the analog signals at terminals 565 and 750. When the analog signals at terminals 565 and 750 are substantially equal, indicating that the speed of shaft 23 is substantially equal to the speed of flywheel 17 divided by the fixed reduction of reducer 19, HST control circuit 104 is operative to produce a signal at output terminal 753.

Terminal 753 is connected to terminal 755 of selector 68. Receipt of a signal at terminal 755 causes termination of the LOW signal with the following results:

a. clutch 21 is engaged, thereby recoupling flywheel 17 to shaft 23.

b. injector control 102 returns to normal operation in response to the analog signal at terminal 624, and c. as a result of the elimination of the signal to input 776, HST control reverts to normal operation in response to the analog signals appearing at terminals 510 and 630.

The power train for operation in mode I is thus reestablished and the vehicle is now prepared for normal operation in mode I.

If, a. if the current operational mode of the vehicle is LOW and the analog value of the signal at 740 is less than a value corresponding to a flywheel speed hereinabove referred to as SFW min (5800 rpm in the present embodiment), and b. the value of the signal at terminal 740 is greater than the hereinabove described minimum speed (4500 rpm in the present embodiment), and c. the analog value of the signal at 742 is greater than a value corresponding to the vehicle speed at which a transition between mode I and mode II normally takes place approx. 25 km/hr in the present embodiment), and d. the operator presses accelerator pedal 70 so that the analog signal from 70 is greater than zero, positioning of lever 73 in DRIVE is operational to provide a DRIVE signal at the DRIVE output terminal of selector 68, a LOW signal at the LOW output terminal and a signal at output terminal 775 of selector 68.

As described hereinabove, the simultaneous occurrence of DRIVE and LOW signals causes injector 64 to terminate the supply of fuel to heat engine 10.

As described hereinabove, outputs from sensors 50 and 56 are also provided to terminals 756 and 758 of HST control 104, and output terminal 775 of selector 68 is coupled to terminal 774 of HST control 104.

The simultaneous presence of signals at terminals 756, 758 and 774 of HST control 104 indicates that (a) the gears are disposed for operation in mode I, (b) the operator has just switched from LOW to DRIVE, and (c) the transition from mode LOW to mode II has not been completed. HST control 104 is now operative to provide a large positive signal at output terminal 512 which is operational to rapidly increase the transmission ratio of transmission 15 towards the end of its useful range (1:1.34 in the present embodiment).

Verification that this ratio is reached is provided by sensor 80. All of the signals are now present at terminals 634, 632 and 636 of AND gate 140 to produce Control Signal V. Control Signal V is operational to initiate and carry out the transition from mode I to operation in mode II, as described hereinabove. Consequently, once sensor 80 is activated, the gear coupling arrangement will be changed from the coupling arrangement for operation in mode I to the coupling arrangement for operation in mode II, all as described hereinabove.

Normally the transition from mode I to mode II is completed by reengaging clutches 21 and 12, as described hereinabove. However, the presence of a signal at terminal 724 of clutch control 146, indicating that the vehicle is in the LOW mode or is in a state of transition from the LOW mode prevents clutch control 146 from providing a signal at terminal 528 of clutch 21, thereby preventing clutch 21 from being engaged.

HST control 104 is operative, upon receipt of signals at terminals 628 and 629 (indicating that the gears are disposed for operation in mode II) and upon receipt of a signal at terminal 774, (indicating that the vehicle is in the process of transition from the LOW mode), to provide an analog signal at output terminal 512 proportional to the difference between the analog signal at terminal 565 (which is proportional to the rotational speed of shaft 23) and the analog signal at terminal 750 (which is proportional to the speed of the shaft 84).

The hereinabove described signal at terminal 512 is operative to rapidly change the transmission ratio of transmission 15 in a direction which reduces the difference between the value of the analog signals at terminals 565 and 750. When the analog signals at terminals 565 and 570 are substantially equal, HST control 104 is operative to produce a signal at output terminal 753.

As described hereinabove, the control signal at terminal 753, which indicates that the speeds of shafts 84 and 23 are substantially equal, enables:

a. clutch control 146 to engage clutch 21, b. injector control 102 to return to normal operation, and c. selector 68 to remove the LOW signal from selector 68, all as described hereinabove.

The vehicle is now restored to normal operation in mode II.

If the system is disposed for operation in mode I or in the LOW mode, selector 68 is operative to provide a REVERSE signal provided that (a) signals appear at terminals 762 and 764 (indicating disposition in mode I) and at terminal 760, (indicating a transmission ratio setting of 1:0, and (b) the operator positions lever 73 in REVERSE.

The REVERSE signal is provided to terminal 734 of HST control 104. If the transmission ratio of transmission 15 is at 1:0 receipt of the REVERSE signal at terminal 734 causes HST control 104 to reverse the polarity of the analog signal appearing at output terminal 512. Consequently a positive analog signal appearing at terminal 510 of HST control 104, which normally results in a signal to ratio selector 67 to increase the transmission ratio of transmission 15 resulting in acceleration of the vehicle, will result in a signal to ratio selector 67 to move in the opposite direction, such that the slidable sleeve 169 is moved so as to put the transmission 15 in reverse. An increasingly large positive signal at 510 will result in an increasingly large rate of speed in the reverse direction. In the present embodiment, transmission 15 is limited to approximately a ratio of 1:-0.4, which results in a maximum speed in reverse of approx. 11 km/hr.

Pressure on brake pedal 72 will result in a signal at 512 to cause ratio selector 67 to move the slidable sleeve 169 so that the transmission ratio of transmission 15 is moved towards the ratio 1:0, thereby slowing down the vehicle.

Sensor 82 also provides an output signal to terminal 766 of HST control 104.

If the vehicle is in reverse, and pressure on brake pedal 72 causes the transmission 15 to increase its ratio past 1:0, so that sensor 82 is no longer operated, the elimination of the signal at terminal 766 of HST control 104 causes the hereinabove mentioned polarity inversion to be eliminated, so that continued pressure on brake pedal 72 will cause HST control 104 to return the transmission ratio of transmission 15 to 1:0. Consequently the vehicle cannot inadvertently advance in the forward direction when in REVERSE.

A transition between the LOW mode and REVERSE is automatically effected by the control circuit provided in accordance with an embodiment of the invention.

If the current operational mode of the vehicle is LOW, the REVERSE signal will provide an output signal at the REVERSE terminal of selector 68 if there is simultaneously a control signal at terminal 760 of selector 68 indicating that the transmission ratio of transmission 15 is at 1:0. Selector 68 is also operational to retain a control signal at the LOW output terminal if the transition is from LOW to REVERSE modes of operation. The simultaneous presence of control signals at the LOW and REVERSE output terminals of selector 68 therefore is indicative of the operators intention to travel in reverse while the system is disposed for operation in mode LOW. The simultaneous presence of control signals at terminals 734, 766 and 720 of HST control 104 causes HST control 104 to (a) reverse the polarity of the analog signal at output terminal 512 so as to cause selector 67 to change the transmission ratio of transmission 15 in exactly the same manner as described for operation in REVERSE when not in the LOW mode, and (b) to determine the magnitude of the analog signal at terminal 512 in the same manner as described for operation in LOW mode.

If the current operation mode of the system is LOW and REVERSE, positioning of lever 73 in LOW will cause selector 68 to remove the control signal from output terminal REVERSE and thereby to resume operation in the LOW mode.

A particular feature of the present invention is the manner in which the heat engine and hydrostatic transmission can be utilized to provide near optimum efficiency of both.

Figure 5A:
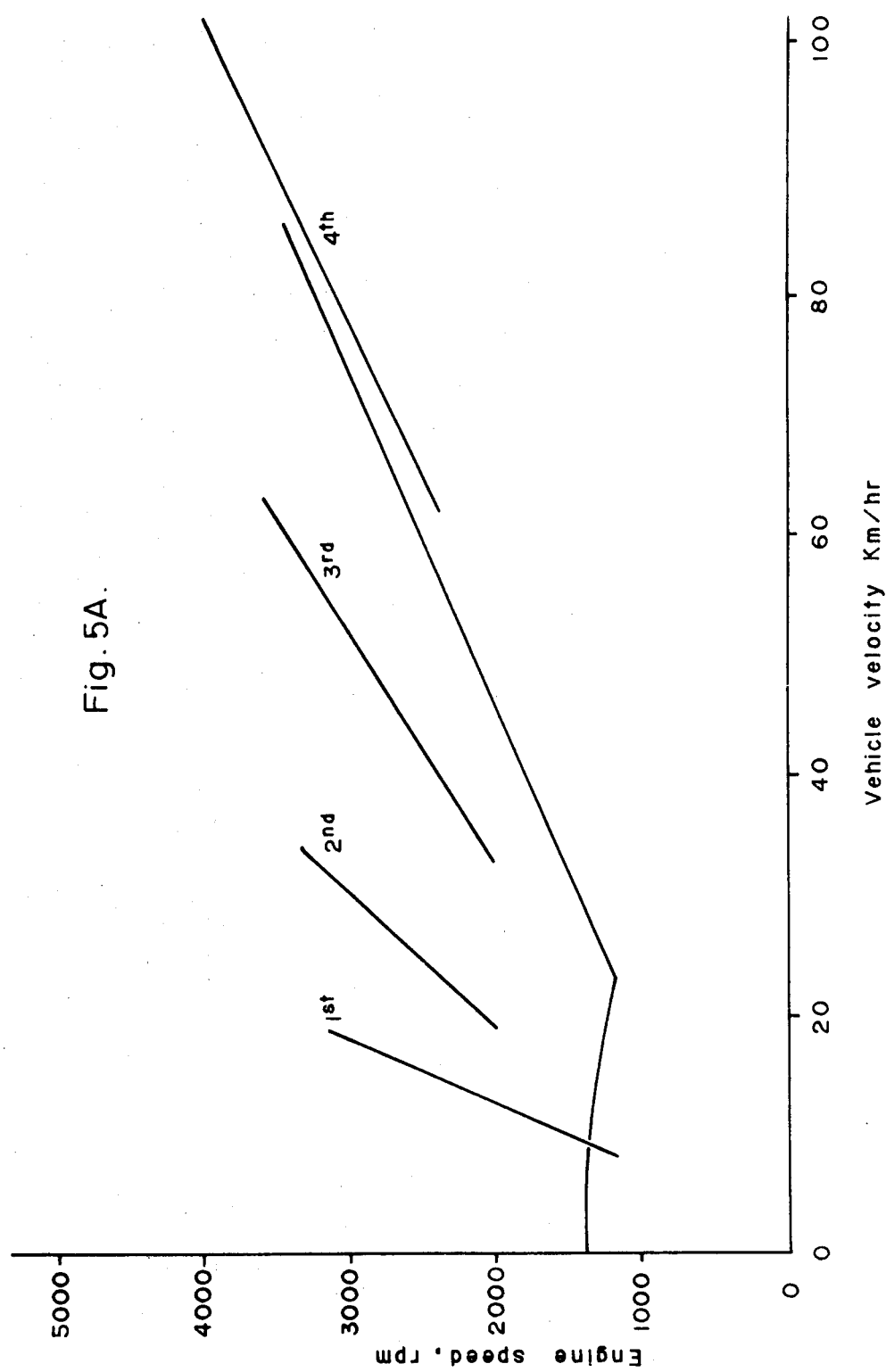
FIG. 5A is a plot of engine speed as a function of vehicle velocity for the vehicle of an embodiment of the present invention as compared with a conventional vehicle having a manual transmission.

Referring now to FIG. 5A, there is provided a graph showing the speed of the heat engine used in the preferred embodiment of the invention as a function of the velocity of the vehicle. On the same graph, the engine speed of a conventional vehicle, capable of essentially the same performance, equipped with a 4 speed manual transmission is shown.

Referring now to the earlier discussion regarding the desirability of relatively low engine speeds corresponding to low vehicle speeds, it is seen that in the first mode of operation, the engine speed is relatively low, and in the second and highway modes the engine speed increases as a linear function of the vehicle velocity, to provide for increasing cruising power requirements.

In contrast, the engine speed of the conventional engine is considerably higher at low vehicle speeds. The reason for this higher speed requirement is that the engine of the conventional vehicle must be capable of providing acceleration power upon demand and the engine must therefore rotate at a relatively high speed to produce adequate power.

The heat engine of the present invention may rotate at a relatively slow rate because it is not called upon to provide power for acceleration of the vehicle.

Figure 5B:
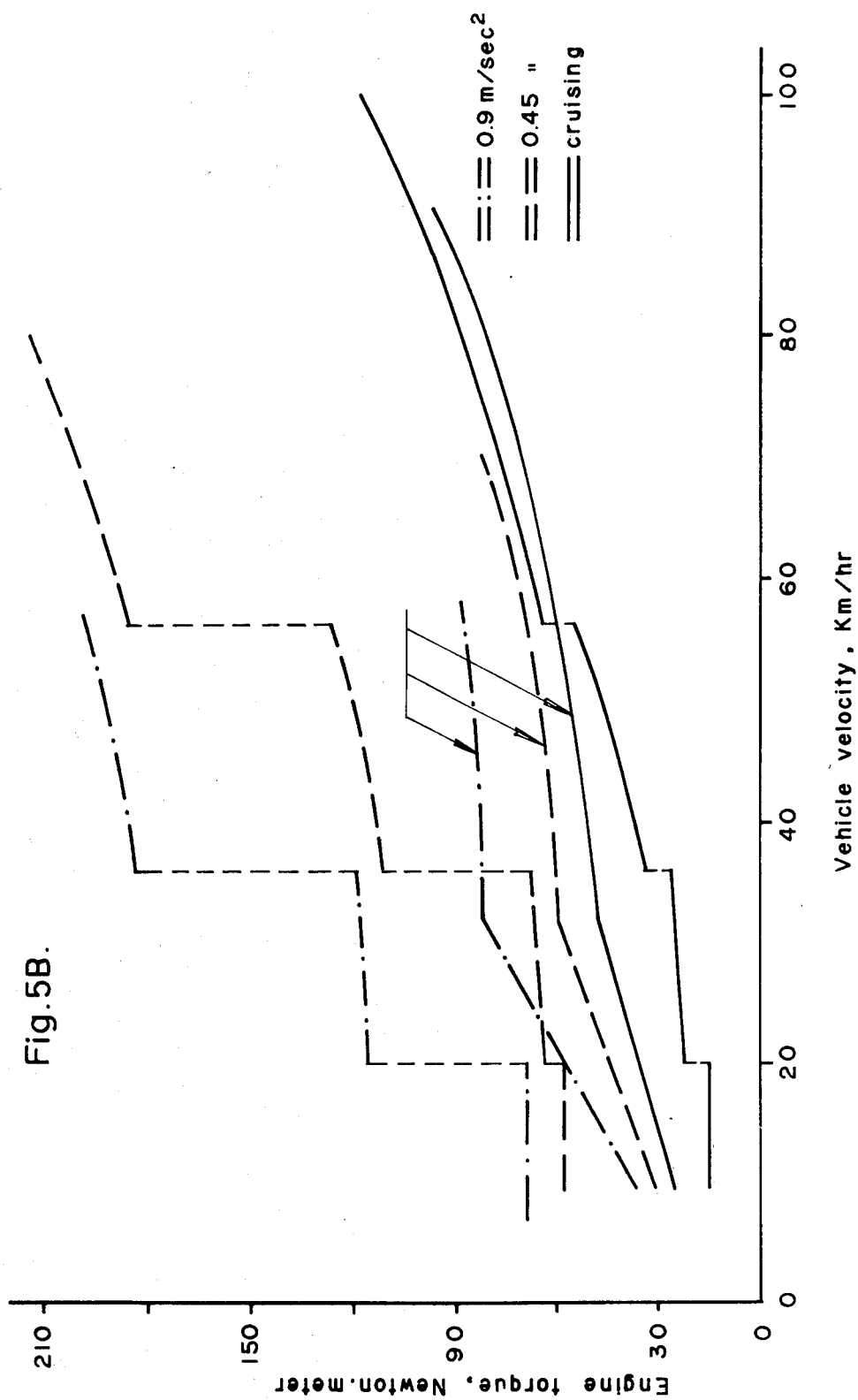
FIG. 5B is a plot of engine torque as a function of vehicle velocity for the vehicle of an embodiment of the present invention as compared with a conventional vehicle having a manual transmission.

Referring now to FIG. 5B, there is shown a graph comparing the torque of the heat engine used in a preferred embodiment of the invention as a function of vehicle velocity and acceleration. On the same graph, the engine torque of a conventional vehicle equipped with the 4-speed manual transmission is shown.

The torque of the engine used in the present invention is considerably lower than the torque of the conventional engine for all but cruising conditions at low vehicle velocities because the engine of the present invention does not provide power for acceleration.

Thus, in the majority of instances, both engine speed and torque of the engine used in the present invention are substantially lower than the engine speed and torque in the conventional vehicle.

The above described feature of lower engine speed combined with simultaneous lower engine torque in the present invention is in direct contrast to systems employing a conventional engine driving the vehicle through a continuously variable transmission. In such systems, fuel economy is achieved by operating the heat engine at or near the lowest possible speed for any given torque demand. Consequently, a low average engine speed is achieved but at the expense of much higher engine torques.

In the present invention, low engine speeds simultaneous with low engine torques are possible.

The concomitant advantages in fuel consumption, low pollution, and engine life of the heat engine in the present invention have been discussed above.

Figure 6:
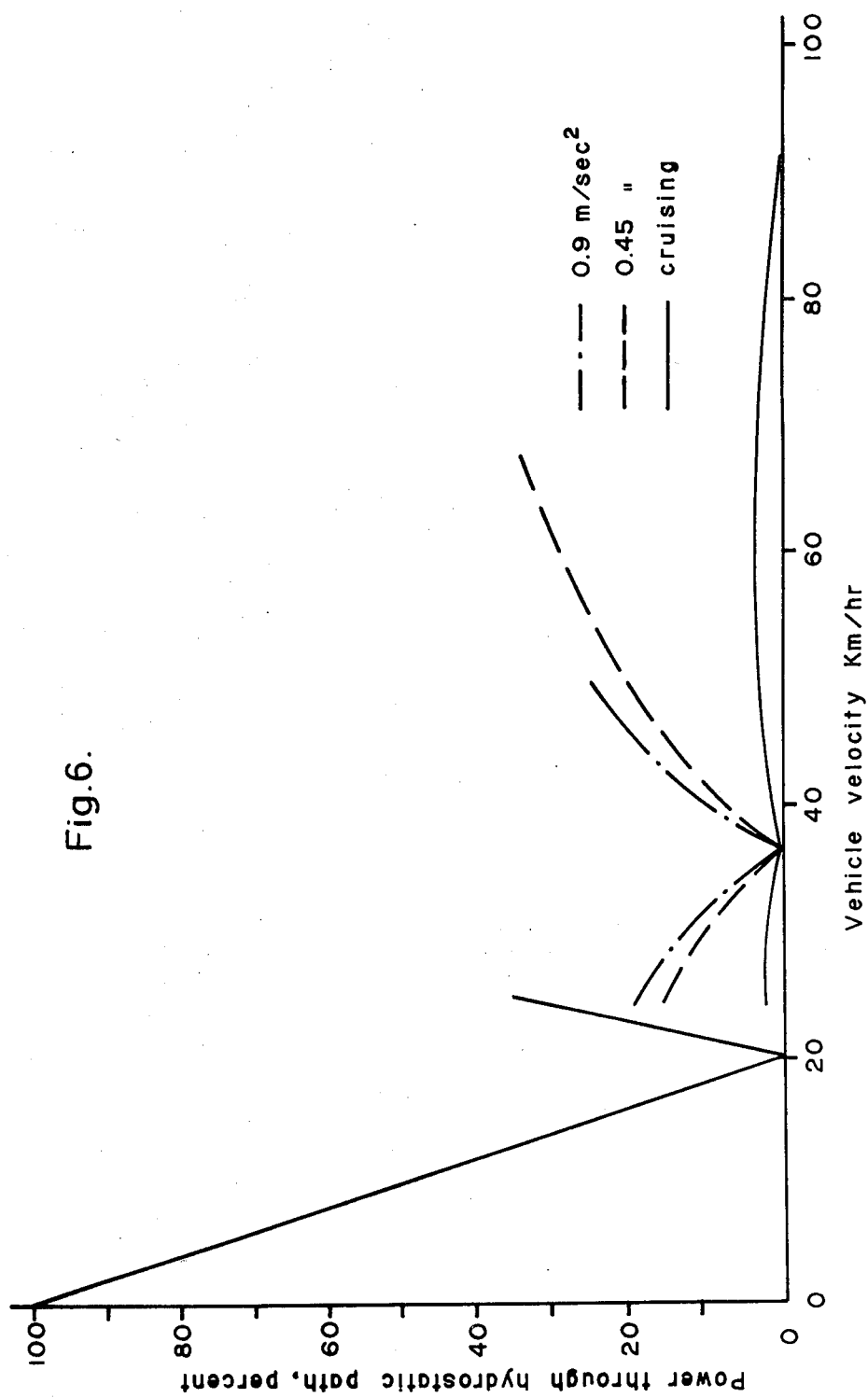
FIG. 6 is a plot of percentage of total power delivered to the wheels that is transmitted hydraulically as a function of vehicle velocity for various acceleration levels of an embodiment of the invention.

Referring now to FIG. 6, there is shown a graph of the percentage of power transmitted hydraulically through the hydrostatic transmission (relative to the total power transmitted to the wheels) as a function of vehicle velocity and acceleration.

It is appreciated that the lower the percentage of power transmitted hydraulically, the higher is the efficiency of the transmission.

In the first mode of operation, power from the flywheel and heat engine passes through the hydrostatic transmission. The hydrostatic transmission divides the power flowing through it into hydraulic and mechanical paths, as described in the abovementioned reference.

In the second mode of operation, power from the heat engine bypasses the hydrostatic transmission entirely. Consequently, during cruising in the second mode or highway mode, the only power flowing through the hydrostatic transmission is the power necessary to maintain the speed of the flywheel.

During acceleration in the second mode, only the acceleration power provided by the flywheel passes through the hydrostatic transmission, which divides the power mechanically and hydraulically. The higher the rate of acceleration, the higher the proportion of power flowing through the hydrostatic transmission. At no point however in the second mode is the percentage of power transmitted hydraulically greater than approximately 35%.

The various features of the invention have been described hereinabove in detail with reference to diagrams illustrating the construction and operation of a specific preferred embodiment of the invention. It is to be clearly understood that many other embodiments of the invention may also be constructed and operated within the scope of the invention. Therefore the invention is limited only by the claims which follow:

We claim:

1. A vehicle drive system comprising:
 a source of rotational energy;
 a flywheel;
 continuously variable transmission means comprising first and second drive terminals; and
 means for selectable coupling of said variable transmission means and said source of rotational energy to said flywheel and drive wheels in a vehicle and including
 first means for coupling in a first mode of operation;
  (1) said flywheel and said source of rotational energy to said first drive terminal; and
  (2) said second drive terminal to the drive wheels of a vehicle; and
 second means for coupling in a second mode of operation;
  (1) said flywheel to said second drive terminal;
  (2) said rotational energy source and said first drive terminal to said drive wheels; and
 control means for governing the operation of said continuously variable transmission means and the operation of said source of rotational energy and being capable of independent control of the speed of said flywheel and of said source of rotational energy
 wherein said selectable coupling means also comprises first and second shaft means; and
 wherein said first means is operative for coupling in said first mode of operation;
  (1) said flywheel to said first shaft means;
  (2) said first shaft means to said first drive terminal;
  (3) said rotational energy source to said first drive terminal;
  (4) said second drive terminal so said second shaft means; and said second means is operative for coupling in said second mode of operation;

(1) said flywheel to said first shaft means;
(2) said first shaft means to said second drive terminal;
(3) said rotational energy source to said first drive terminal; and
(4) said first drive terminal to said second shaft means.

2. A vehicle drive system according to claim 1 wherein said selectable coupling means also comprises:
means for coupling in a starting mode of operation:
(1) said source of rotational energy to said first drive terminal; and
(2) said flywheel to said second drive terminal.

3. A vehicle drive system according to claim 1 wherein said selectable coupling means also includes:
means for coupling in a hill-climbing mode of operation
(1) said source of rotational energy to said first drive terminal; and
(2) said second drive terminal to said drive wheels.

4. A vehicle drive system according to claim 1 wherein said selectable coupling means are operative such that transitions between said first and second modes of operation occur substantially synchronously.

5. A vehicle drive system according to claim 2 wherein said means for coupling in a starting mode of operation is operative to couple:
(1) said source of rotational energy to said first drive terminal,
(2) said second drive terminal to said first shaft means and
(3) said flywheel to said first shaft means.

6. A vehicle drive system comprising:
(a) continuously variable transmission means including first and second drive terminals;
(b) first shaft means;
(c) second shaft means couplable to the drive wheels of a vehicle;
(d) a flywheel;
(e) a source of rotational energy;
(f) starting means for selectably coupling in a starting mode of operation;
(1) said source of rotational energy to said first drive terminal,
(2) said second drive terminal to said first shaft means, and
(3) said flywheel to said first shaft means;
(g) first means for selectably coupling in a first mode of operation:
(1) said flywheel to said first shaft means,
(2) said first shaft means to said first drive terminal,
(3) said rotational energy source to said first drive terminal,
(4) said second drive terminal to said second shaft means;
(h) second means for selectably coupling in a second mode of operation:
(1) said flywheel to said first shaft means,
(2) said first shaft means to said second drive terminal,
(3) said rotational energy source to said first drive terminal,
(4) said first drive terminal to said second shaft means;
said first and second means being operative such that transitions between said first and second modes of operation occur substantially synchronously.

7. A vehicle drive system according to claim 6 wherein said continuously variable transmission means comprises a single variable transmission.

8. A vehicle drive system according to claim 7 wherein said single variable transmission is operable to transmit power either from said first drive terminal to said second drive terminal or from said second drive terminal to said first drive terminal.

9. A vehicle drive system according to claim 6 wherein said control means comprises:
means for determining the total kinetic energy of the vehicle and the flywheel;
means for comparing the total kinetic energy with a reference kinetic energy to produce a control signal;
fuel supply means responsive to said control signal to govern the fuel supply to said heat engine and thereby to govern the output thereof.

10. A vehicle drive system according to claim 9 and also comprising:
operator-actuated means for producing a desired torque output signal;
means responsive to said control signal and to said desired torque output signal for producing a hydrostatic transmission ratio control signal indicative of the sense and the magnitude of the difference between the desired torque indicated by an operator and the torque of said heat engine indicated by said torque control signal; and
hydrostatic transmission actuator means operative to vary the transmission ratio of said variable transmission means in response to said hydrostatic transmission ratio control signal.

11. A vehicle drive system according to claim 9 and also comprising:
operator-actuated means for producing a desired power output signal;
means responsive to said control signal and to said desired power output signal for producing a hydrostatic transmission ratio control signal indicative of the sense and the amplitude of the difference between the desired power indicated by an operator and the power output of said heat engine indicated by said power control signal; and
hydrostatic transmission actuator means operative to vary the transmission ratio of said variable transmission means in response to said hydrostatic transmission ratio control signal.

12. A vehicle drive system according to claim 6 wherein said control means comprise synchronizer means for selectably coupling said first and second shafts to said first and second drive terminals.

13. A vehicle drive system according to claim 6 wherein said means for selectable coupling also comprise:
first gear means coupled to said first drive terminal;
second gear means coupled to said second drive terminal;
third gear means selectably couplable to said first shaft and disposed for coupling to said first gear means;
fourth gear means selectably couplable to said first shaft and disposed for coupling to said second gear means;
fifth gear means selectably couplable to said second shaft and disposed for coupling to said first gear means;

sixth gear means selectably couplable to said second shaft and disposed for coupling to said second gear means;

14. A vehicle drive system according to claim 13 wherein the ratio of the number of gear teeth in said first, second, third, fourth, fifth, sixth gear means are selected such that transitions between said first and second modes of operation occur substantially synchronously whereby the rotational velocity between said first and second shafts and the respective gear means being coupled thereto are very nearly matched before and during said transitions thereby producing a substantially continuous power flow.

15. A vehicle drive system according to claim 13 wherein the number of teeth on said first, second, third, fourth, fifth and sixth gears are selected to be in the following ratio:

$$\frac{\frac{D_{38}}{D_{37}}}{\frac{D_{40}}{D_{39}}} = \frac{\frac{D_{38}}{D_{33}}}{\frac{D_{40}}{D_{35}}} = \alpha$$

where
$D_i$ = diameter or number of teeth of gear of index i with reference to FIG. 1

$$\alpha = \frac{\text{rotation speed of first drive terminal}}{\text{rotation speed of second drive terminal}}$$

at the point in time when gear engagement is to take place.

16. A vehicle drive system according to claim 13 wherein said selectable coupling means also comprises:
first synchronizing means operative for selectable engagement with said first shaft and either of said third or fourth gear means; and
second synchronizing means operative for selectable engagement with said second shaft and either of said fifth or sixth gear means;

17. A vehicle drive system according to claim 1 wherein said selectable coupling means comprises first clutch means operative to selectably couple said flywheel to said first shaft means; and
second clutch means operative to selectably couple said rotational energy source to said first drive terminal.

18. A vehicle drive system according to claim 1 comprising a fixed gear reducer coupled between said flywheel and said continuously variable transmission means.

19. A vehicle drive system according to claim 1 wherein said control means include means operative in selected modes of operation to govern the torgue output of said source of rotational energy so as to maintain the total kinetic energy of a vehicle substantially constant.

20. A vehicle drive system according to claim 1 wherein said control means comprises means operative in selected modes of operation for governing the transmission ratio of a vehicle in response to the difference between the desired torque indicated by an operator and the current torque output of the engine.

21. A vehicle drive system according to claim 1 wherein said control means include means operative in selected modes of operation to govern the power output of said source of rotational energy so as to maintain the total kinetic energy of a vehicle substantially constant.

22. A vehicle drive system according to claim 1 wherein said control means comprises means operative in selected modes of operation for governing the transmission ratio of a vehicle in response to the difference between the desired power indicated by an operator and the current power output of the engine.

23. A vehicle drive system according to claim 1 wherein said control means also comprises means operative in a highway mode of operation to govern the torque output of said source of rotational energy in response to the torque demand indicated by an operator.

24. A vehicle drive system according to claim 1 wherein said control means also comprises means operative in a highway mode of operation to govern the power output of said source of rotational energy in response to the power demand indicated by an operator.

25. A vehicle drive system according to claim 1 wherein said control means also comprises means operative in a highway mode of operation to govern the transmission ratio of a vehicle so as to maintain the speed of said flywheel substantially constant.

26. A vehicle drive system according to claims 1 wherein said control means also comprises means operative in a highway mode of operation to increase the speed of said flywheel to a predetermined level so as to restore the total kinetic energy of the system to a predetermined level.

27. A vehicle drive system, according to claim 1 wherein said control means includes means operative in a selected mode of operation to permit rotation of said source of rotational energy by said flywheel even in the absence of a fuel supply to said source of rotational energy.

* * * * *